US012812325B2

(12) United States Patent
Ying et al.

(10) Patent No.: US 12,812,325 B2
(45) Date of Patent: Nov. 24, 2026

(54) TERMINAL DEVICE SENSING METHOD AND COMMUNICATION APPARATUS

(71) Applicant: HUAWEI TECHNOLOGIES CO., LTD., Shenzhen (CN)

(72) Inventors: Jiangwei Ying, Beijing (CN); Yanmei Yang, Beijing (CN); Wanqiang Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 203 days.

(21) Appl. No.: 18/591,481

(22) Filed: Feb. 29, 2024

(65) Prior Publication Data

US 2024/0205639 A1 Jun. 20, 2024

Related U.S. Application Data

(63) Continuation of application No. PCT/CN2022/116097, filed on Aug. 31, 2022.

(30) Foreign Application Priority Data

Sep. 1, 2021 (CN) ........................ 202111023168.0

(51) Int. Cl.
*H04W 4/02* (2018.01)
*H04W 12/08* (2021.01)

(52) U.S. Cl.
CPC ............ *H04W 4/02* (2013.01); *H04W 12/08* (2013.01)

(58) Field of Classification Search
CPC ......... H04W 4/02; H04W 12/08; H04W 4/38; H04W 64/00

(Continued)

(56) References Cited

U.S. PATENT DOCUMENTS

2020/0228918 A1* 7/2020 Johnston ............... H04L 63/107
2021/0051477 A1* 2/2021 Suh ....................... H04W 12/08

(Continued)

FOREIGN PATENT DOCUMENTS

CN 112738758 A 4/2021
CN 112788518 A * 5/2021 ........... H04W 4/025
EP 4369750 A1 5/2024

OTHER PUBLICATIONS

Introduction of network based Sensing in 5G Advanced; [Vivo, China telecom, China unicom]; Jul. 30, 2021; 17 pages (Year: 2021).*

(Continued)

*Primary Examiner* — Hirdepal Singh
(74) *Attorney, Agent, or Firm* — Rimon PC

(57) ABSTRACT

A UE sensing method and a communication apparatus are provided for improved UE-side security and privacy. An SF network element, an NEF network element, an AMF network element, an SMF network element, or a RAN network element may perform sensing detection, and provide a corresponding sensing service, on a UE for a sensing requester or the UE. The sensing requester may be the UE or an application function. The application function may directly request the sensing service from a communication system like a 5GS, and the UE may request the sensing service from the communication system. The communication system performs sensing by directly requesting a sensing resource from the RAN network element based on a sensing requirement of the UE, or may perform sensing in collaboration with the RAN network element, and quickly and efficiently obtain sensing data.

17 Claims, 19 Drawing Sheets

(58) Field of Classification Search
USPC ........................................................ 455/456.2
See application file for complete search history.

(56) References Cited

U.S. PATENT DOCUMENTS

| | | | | |
|---|---|---|---|---|
| 2023/0370820 | A1* | 11/2023 | Cheng | H04W 4/38 |
| 2024/0196216 | A1* | 6/2024 | Chen | H04L 63/102 |
| 2024/0196255 | A1* | 6/2024 | Yao | H04W 24/10 |

OTHER PUBLICATIONS

Vivo China Telecom China Unicom: "Introduction of network based Sensing in 5G Advanced," 3GPP Draft S2-2106008, 3rd Generation Partnership Project (3GPP), Mobile Conference Centre; 650, Route Des Lucioles; F-06921 Sophia-Antipolis Cedex, Rance, Aug. 10, 2021; URL: https://ftp.3gpp.org/tsg_saw/WG2_Arch/TSGS2_146E_Electronic_2021-08/Docs/S2-2106008.zip; S2-2106008; 17 total pages.

* cited by examiner

TERMINAL DEVICE SENSING METHOD AND COMMUNICATION APPARATUS

CROSS-REFERENCE TO RELATED APPLICATIONS

This application is a continuation of International Application No. PCT/CN2022/116097, filed on Aug. 31, 2022. The International Application claims priority to Chinese Application No. 202111023168.0, filed on Sep. 1, 2021. The afore-mentioned patent applications are hereby incorporated by reference in their entirety.

TECHNICAL FIELD

This application relates to the field of communication sensing, and more specifically, to a terminal device sensing method and a communication apparatus.

BACKGROUND

As communication technologies have evolved, sensing capabilities have been derived from the communication frequency band, especially the millimeter-wave frequency band. When an access network (RAN) network element or a terminal has a sensing capability, sensing can be performed on a specific area, a specific object, a specific event, or the like, so that sensing requirements in many scenarios can be met.

However, currently, there is no solution to sensing for user equipment (UE) in the industry.

SUMMARY

This application provides a terminal device sensing method and a communication apparatus, to support sensing for UE in an end-to-end manner.

According to a first aspect, a terminal device sensing method is provided. The method includes the following steps:

An NEF (Network Exposure Function) network element receives a first sensing service request message, where the first sensing service request message is used to request a first sensing service, and the first sensing service is to sense a UE.

The NEF network element determines, based on the first sensing service request message, that the first sensing service is authorized.

The NEF network element sends a second sensing service request message to a sensing network element, where the second sensing service request message is used to request the first sensing service.

Optionally, a UE sensing method is further provided. The method includes the following steps:

An NEF network element receives a first sensing service request message, where the first sensing service request message is used to request a first sensing service, and the first sensing service senses user equipment UE.

The NEF network element sends a second sensing service request message to an AMF network element, where the second sensing service request message is used to request the first sensing service.

With reference to the first aspect, in some implementations of the first aspect, that the NEF network element determines, based on the first sensing service request message, that the first sensing service is authorized includes:

The NEF network element sends a sensing authorization request message to a UDM network element based on the first sensing service request message, where the sensing authorization request message is used to request to confirm that the first sensing service is authorized.

The NEF network element receives an authorization response message from the UDM network element, where the authorization response message indicates that the first sensing service is authorized.

The NEF network element determines, based on the authorization response message, that the first sensing service is authorized.

With reference to the first aspect, in some implementations of the first aspect, the authorization response message includes service authorization information.

With reference to the first aspect, in some implementations of the first aspect, the sensing authorization request message includes one or more of the following:

a first identifier of the UE, a sensing service type, a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, a sensing feedback manner, a sensing requester type, a sensing requester identifier, a sensing application type, and a sensing application identifier.

The sensing distance, the sensing area, the sensing speed range, the sensing distance resolution, the angle measurement accuracy of sensing, the sensing speed resolution, the sensing quality of service QoS requirement, the sensing object identification accuracy, the sensing object identification false alarm rate, the sensing data accuracy, the sensing data update frequency, the sensing dimension, the sensing feedback manner, the sensing service type, the sensing requester type, the sensing requester identifier, the sensing application type, and the sensing application identifier are determined based on the first sensing service request message.

With reference to the first aspect, in some implementations of the first aspect, the first sensing service request message includes the first identifier of the UE, and the sensing authorization request message includes a second identifier of the UE.

The sensing authorization response message includes the second identifier of the UE.

The second sensing service request message includes the second identifier of the UE.

With reference to the first aspect, in some implementations of the first aspect, before the NEF network element sends the second sensing service request message to the sensing network element, the method further includes the following step:

The NEF network element obtains location information of the UE from a gateway mobile location center (GMLC) network element based on the second identifier of the UE.

In addition, the second sensing service request message includes the location information of the UE.

According to a second aspect, a terminal device sensing method is provided. The method includes the following steps:

An SF network element receives a sensing service request message, where the sensing service request message is used to request a first sensing service, and the first sensing service senses the UE.

The SF network element determines a first network element based on the sensing service request message, where the first network element supports the first sensing service.

The SF network element sends a sensing control request message to the first network element, where the sensing control request message is used to control a RAN network element to perform a sensing operation of the first sensing service.

Optionally, the first network element may be an AMF network element, the RAN network element, or an SMF network element.

With reference to the second aspect, in some implementations of the second aspect, the sensing service request message includes a second identifier of the UE, and that the SF network element determines a first network element based on the sensing service request message includes:

The SF network element determines the first network element based on the second identifier of the UE.

With reference to the second aspect, in some implementations of the second aspect, the sensing service request message includes location information of the UE.

That the SF network element determines a first network element based on the sensing service request message includes:

The SF network element determines the first network element based on the location information of the UE.

With reference to the second aspect, in some implementations of the second aspect, the sensing service request message includes an identifier of the UE, and that the SF network element determines a first network element based on the sensing service request message includes:

The SF network element obtains location information of the UE based on the identifier of the UE included in the sensing service request message.

The SF network element determines the first network element based on the location information of the UE.

With reference to the second aspect, in some implementations of the second aspect, the method further includes the following step:

The SF network element allocates a sensing correlation identifier to the UE, where the sensing correlation identifier is used to identify sensing data of the UE.

With reference to the second aspect, in some implementations of the second aspect, the sensing control request message includes the location information of the UE and/or the sensing correlation identifier, where the sensing correlation identifier is used to identify the sensing data of the UE.

With reference to the second aspect, in some implementations of the second aspect, the method further includes the following step:

The SF network element receives first sensing data and the sensing correlation identifier from the first network element.

With reference to the second aspect, in some implementations of the second aspect, the first network element is the AMF network element, and the method further includes the following step:

The SF network element establishes a sensing signaling connection between the SF network element and the AMF network element, where the sensing signaling connection is used by the SF network element and the AMF network element to interact signaling of the first sensing service of the UE.

According to a third aspect, a terminal device sensing method is provided. The method includes the following steps:

A second network element receives a first request message, where the first request message is used to request a sensing service of the UE.

The second network element sends a response message of the first request message, where the response message indicates that the sensing service of the UE is accepted.

With reference to the third aspect, in some implementations of the third aspect, before the second network element returns the response message of the first request message, the method further includes the following step:

The second network element determines that the sensing service of the UE is authorized.

With reference to the third aspect, in some implementations of the third aspect, the first request message includes sensing indication information, and the sensing indication information indicates to request the sensing service.

With reference to the third aspect, in some implementations of the third aspect, the response message includes sensing accept indication information, and the sensing accept indication information indicates that the sensing service of the UE is accepted.

With reference to the third aspect, in some implementations of the third aspect, the response message includes address information of a sensing network element.

With reference to the third aspect, in some implementations of the third aspect, that the second network element determines that the sensing service of the UE is authorized includes:

The second network element obtains subscription information of the UE, where the subscription information includes service authorization information of the UE.

The second network element determines, based on the service authorization information, that the sensing service of the UE is authorized.

With reference to the third aspect, in some implementations of the third aspect, the service authorization information includes first sensing authorization indication information, and the first sensing authorization indication information indicates that the sensing service of the UE is authorized.

With reference to the third aspect, in some implementations of the third aspect, the service authorization information includes a first sensing authorization parameter, and the first sensing authorization parameter includes one or more of the following:

a sensing service type, a sensing distance, a sensing area, a sensing speed range, a sensing distance resolution, an angle measurement accuracy of sensing, a sensing speed resolution, a sensing quality of service QoS requirement, a sensing object identification accuracy, a sensing object identification false alarm rate, a sensing data accuracy, a sensing data update frequency, a sensing dimension, a sensing feedback manner, a sensing requester type, a sensing requester identifier, a sensing application type, and a sensing application identifier.

With reference to the third aspect, in some implementations of the third aspect, the method further includes the following steps:

The second network element obtains second sensing authorization indication information and/or a second sensing authorization parameter based on the service authorization information.

The second network element sends the second sensing authorization indication information and/or the second sensing authorization parameter to a RAN network element.

With reference to the third aspect, in some implementations of the third aspect, the method further includes the following steps:

The second network element receives a first sensing service request message from the UE, where the first sensing service request is used to request the first sensing service.

The second network element sends a second sensing service request message to the sensing network element, where the second sensing service request message is used to request the first sensing service for the UE.

With reference to the third aspect, in some implementations of the third aspect, the second network element is an AMF network element or an SMF network element.

With reference to the third aspect, in some implementations of the third aspect, the first request message is specifically a session management request message, and the response message is specifically a session management response message.

Alternatively, the first request message is specifically a registration request message, and the response message is a registration accept message.

Alternatively, the first request message is specifically a service request message, and the response message is a service accept message.

According to a fourth aspect, a terminal device sensing method is provided. The method includes the following steps:

A UE sends a first request message to a second network element, where the first request message is used to request a sensing service.

The UE receives a response message of the first request message, where the response message indicates that the sensing service of the UE is accepted.

With reference to the fourth aspect, in some implementations of the fourth aspect, the first request message includes sensing indication information, and the sensing indication information indicates to request the sensing service.

With reference to the fourth aspect, in some implementations of the fourth aspect, the response message includes sensing accept indication information, and the sensing accept indication information indicates that the sensing service of the UE is accepted.

With reference to the fourth aspect, in some implementations of the fourth aspect, after the UE receives the response message of the first request message, the method further includes the following steps:

The UE sends a first sensing service request message to a second network element, where the first sensing service request message is used to request a first sensing service.

The UE receives second sensing data of the first sensing service from the second network element.

With reference to the fourth aspect, in some implementations of the fourth aspect, after the UE receives the response message of the first request message, the method further includes the following steps:

The UE sends a sensing request message to a RAN network element for the first sensing service, where the sensing request message is used to request a sensing resource.

The UE receives sensing resource indication information from the RAN network element, where the sensing resource indication information indicates the sensing resource.

The UE performs sensing by using the sensing resource, to obtain first sensing data of the first sensing service.

Optionally, after the UE receives the response message of the first request message, the method further includes the following steps:

The UE sends a sensing service request message to a RAN network element for the first sensing service, where the sensing service request message is used to request the sensing resource.

The UE receives sensing resource indication information from the RAN network element, where the sensing resource indication information indicates the sensing resource.

The UE performs sensing by using the sensing resource, to obtain first sensing data of the first sensing service.

With reference to the fourth aspect, in some implementations of the fourth aspect, after the UE receives the response message from the first request message, the method further includes the following steps:

The UE sends a sensing request message to a RAN network element for the first sensing service, where the sensing request message is used to request a sensing resource.

The UE receives sensing resource indication information from the RAN network element, where the sensing resource indication information indicates the sensing resource.

The UE receives a sensing signal from the RAN network element based on the sensing resource.

The UE obtains first sensing data of the first sensing service based on the sensing signal.

Optionally, after the UE receives the response message from the first request message, the method further includes the following steps:

The UE sends a sensing service request message to a RAN network element for the first sensing service, where the sensing service request message is used to request the sensing resource.

The UE receives sensing resource indication information from the RAN network element, where the sensing resource indication information indicates the sensing resource.

The UE receives a sensing signal from the RAN network element based on the sensing resource.

The UE obtains first sensing data of the first sensing service based on the sensing signal.

With reference to the fourth aspect, in some implementations of the fourth aspect, after the UE receives the response message from the first request message, the method further includes the following steps:

The UE sends a sensing request message to a RAN network element for the first sensing service, where the sensing request message is used to request the RAN network element to perform sensing.

The UE receives sensing resource indication information from the RAN network element, where the sensing resource indication information indicates the sensing resource.

The UE sends a sensing signal based on the sensing resource.

The UE receives first sensing data of the first sensing service from the RAN network element.

Optionally, after the UE receives the response message from the first request message, the method further includes the following steps:

The UE sends a sensing service request message to a RAN network element for the first sensing service, where the sensing service request message is used to request the RAN network element to perform sensing.

The UE receives sensing resource indication information from the RAN network element, where the sensing resource indication information indicates the sensing resource.

The UE sends a sensing signal based on the sensing resource.

The UE receives first sensing data of the first sensing service from the RAN network element.

With reference to the fourth aspect, in some implementations of the fourth aspect, before the UE sends the first sensing request message to the RAN network element, the method further includes the following step:

The UE receives a sensing control request from a sensing network element, where the sensing control request indicates the UE to perform sensing.

With reference to the fourth aspect, in some implementations of the fourth aspect, the method further includes the following steps:

The UE sends the first sensing data to the sensing network element.

The UE receives second sensing data of the first sensing service from the sensing network element.

With reference to the fourth aspect, in some implementations of the fourth aspect, the first request message is specifically a session management request message, and the response message is specifically a session management response message.

Alternatively, the first request message is specifically a registration request message, and the response message is a registration accept message.

Alternatively, the first request message is specifically a service request message, and the response message is a service accept message.

According to a fifth aspect, a terminal device sensing method is provided. The method includes the following steps:

A RAN network element receives a sensing request message from user equipment UE, where the sensing request message is used to request a sensing resource.

The RAN network element sends sensing resource indication information to the UE, where the sensing resource indication information indicates the sensing resource.

With reference to the fifth aspect, in some implementations of the fifth aspect, before the RAN network element sends the sensing resource indication information to the UE, the method further includes the following step:

The RAN network element receives second sensing authorization indication information and/or a second sensing authorization parameter of the UE from a second network element, where the second sensing authorization indication information indicates that a sensing service of the UE is authorized.

With reference to the fifth aspect, in some implementations of the fifth aspect, before the RAN network element sends the sensing resource indication information to the UE, the method further includes the following step:

The RAN network element determines, based on the second sensing authorization indication information and/or the second sensing authorization parameter, to authorize the sensing request of the UE.

With reference to the fifth aspect, in some implementations of the fifth aspect, the sensing request message further includes a sensing requirement.

Before the RAN network element sends the sensing resource indication information to the UE, the method further includes the following step:

The RAN network element determines, based on the second sensing authorization indication information and/or the second sensing authorization parameter and the sensing requirement, to authorize the sensing request.

With reference to the fifth aspect, in some implementations of the fifth aspect, after the RAN network element sends the sensing resource indication information to the UE, the method further includes the following step:

The RAN network element sends a sensing signal to the UE based on the sensing resource.

With reference to the fifth aspect, in some implementations of the fifth aspect, after the RAN network element sends the sensing resource indication information to the UE, the method further includes the following steps:

The RAN network element receives the sensing signal from the UE based on the sensing resource.

The RAN network element obtains first sensing data based on the sensing signal.

The RAN network element sends the first sensing data to the UE.

With reference to the fifth aspect, in some implementations of the fifth aspect, the second sensing authorization parameter includes one or more of the following:

a sensing service type, a sensing distance, a sensing area, a sensing speed range, a sensing distance resolution, an angle measurement accuracy of sensing, a sensing speed resolution, a sensing quality of service QoS requirement, a sensing object identification accuracy, a sensing object identification false alarm rate, a sensing data accuracy, a sensing data update frequency, a sensing dimension, and a sensing feedback manner.

With reference to the fifth aspect, in some implementations of the fifth aspect, the sensing requirement includes one or more of the following:

a sensing service type, a sensing distance, a sensing area, a sensing speed range, a sensing distance resolution, an angle measurement accuracy of sensing, a sensing speed resolution, a sensing quality of service QoS requirement, a sensing object identification accuracy, a sensing object identification false alarm rate, a sensing data accuracy, a sensing data update frequency, a sensing dimension, and a sensing feedback manner.

According to a sixth aspect, a terminal device sensing method is provided. The method includes the following steps:

A UDM network element receives a sensing authorization request message from an NEF network element, where the sensing authorization request message is used to request to confirm that a sensing service of a UE is authorized.

The UDM network element sends an authorization response message to the NEF network element, where the authorization response message indicates that the sensing service of the UE is authorized.

With reference to the sixth aspect, in some implementations of the sixth aspect, the sensing authorization request message includes one or more of the following:

a first identifier of the UE, a sensing service type, a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, a sensing feedback manner, a sensing requester type, a sensing requester identifier, a sensing application type, and a sensing application identifier.

With reference to the sixth aspect, in some implementations of the sixth aspect, the authorization response message includes service authorization information of the UE.

With reference to the sixth aspect, in some implementations of the sixth aspect, the method further includes the following steps:

The UDM network element receives a first request message from an SF network element, where the first request message is used to request a serving AMF of the UE.

The UDM network element returns a response message of the first request message to the SF network element, where the response message includes an identifier of the serving AMF of the UE.

According to a seventh aspect, a communication apparatus is provided. The communication apparatus has a function of implementing the method in any one of the first aspect to the sixth aspect or the method in any one of the possible implementations of the first aspect to the sixth aspect. The function may be implemented by hardware, or may be implemented by hardware executing corresponding software. The hardware or the software includes one or more units corresponding to the foregoing function.

According to an eighth aspect, a communication apparatus is provided, including a processor and a memory. Optionally, the communication apparatus may further include a transceiver. The memory is configured to store a computer program, and the processor is configured to invoke and run the computer program stored in the memory, and control the transceiver to receive and send a signal, to enable the communication apparatus to perform the method according to any one of the first aspect to the sixth aspect or the method according to any one of the possible implementations of the first aspect to the sixth aspect.

According to a ninth aspect, a communication apparatus is provided, including a processor and a communication interface. The communication interface is configured to receive data and/or information, and transmit the received data and/or information to the processor, the processor processes the data and/or information, and the communication interface is further configured to output data and/or information processed by the processor, to enable the method in any one of the first aspect to the sixth aspect or the method in any one of the possible implementations of the first aspect to the sixth aspect to be performed.

According to a tenth aspect, a computer-readable storage medium is provided. The computer-readable storage medium stores computer instructions. When the computer instructions run on a computer, the method in any one of the first aspect to the sixth aspect or the method in any one of the possible implementations of the first aspect to the sixth aspect is enabled to be performed.

According to an eleventh aspect, a computer program product is provided. The computer program product includes computer program code. When the computer program code runs on a computer, the method in any one of the first aspect to the sixth aspect or the method in any one of the possible implementations of the first aspect to the sixth aspect is enabled to be performed.

According to a twelfth aspect, a wireless communication system is provided, including one or more network elements in the method according to any one of the first aspect to the sixth aspect.

For example, the communication apparatus is a corresponding network element in this embodiment of this application.

Optionally, the corresponding network element may be the NEF network element, the sensing network element, the second network element, the UE, the RAN network element, or the UDM network element. Further, optionally, the second network element may be the AMF network element or the SMF network element.

BRIEF DESCRIPTION OF DRAWINGS

FIG. 4(*b*) is a schematic flowchart of a UE sensing method according to this application;

FIG. 6(*b*) is a schematic flowchart of a UE sensing method according to this application;

FIG. 6(*c*) is a schematic flowchart of a UE sensing method according to this application;

FIG. 11(*b*) is a schematic flowchart of a UE sensing method according to this application;

FIG. 12(*b*) is a schematic flowchart of a UE sensing method according to this application;

FIG. 13(*b*) is a schematic flowchart of a UE sensing method according to this application;

DESCRIPTION OF EMBODIMENTS

The following describes technical solutions of embodiments in this application with reference to accompanying drawings.

The method in the embodiments of this application may be applied to a long term evolution (LTE) system, a long term evolution advanced (LTE-A) system, an enhanced long term evolution (eLTE) system, a 5th generation (5G) mobile communication system, or a new radio (NR) system, or may be extended to a similar wireless communication system, such as a wireless fidelity (Wi-Fi) system, a worldwide interoperability for microwave access (WIMAX) system, or a cellular system related to the 3rd generation partnership project (3gpp), and in a future communication system.

With the advancement of mobile communication technologies, 5G networks will be constructed in a flexible and efficient manner. A 5G network may use a communication sensing capability as a new capability. For example, a system architecture of a 5G network may be shown in FIG. 1.

Figure 1:
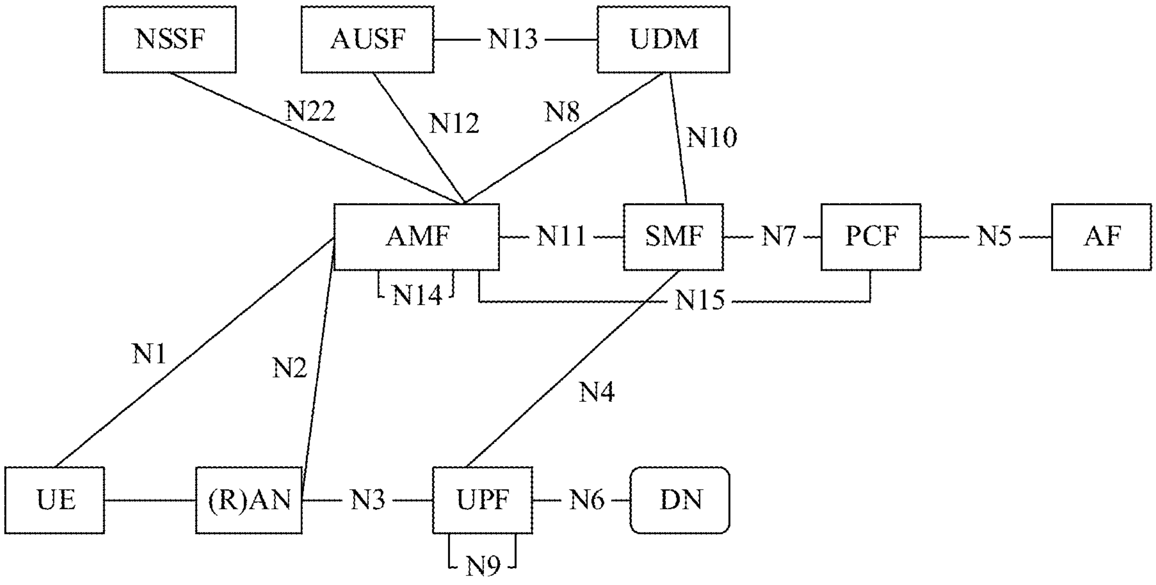
FIG. 1 is an example of a 5G communication system architecture applicable to an embodiment of this application.

FIG. 1 is an example of a 5G communication system architecture applicable to an embodiment of this application. Functions of a terminal device and network entities are described below.

The terminal device may also be referred to as user equipment (UE), an access terminal, a terminal device unit (subscriber unit), a terminal device station, a mobile site, a mobile station (MS), a remote station, a remote terminal, a mobile device, a user terminal, a terminal, a wireless communication device, a terminal device agent, or a terminal device apparatus.

A radio access network RAN) is a network including a plurality of 5G-RAN nodes, and implements a radio physical layer function, resource scheduling and radio resource management, radio access control, and a mobility management function. The 5G-RAN is connected to a UPF through a user plane interface N3, and is configured to transmit data of the terminal device. The 5G-RAN establishes a control plane signaling connection to an AMF through a control plane interface N2 to implement functions such as radio access bearer control.

An access and mobility management function (AMF) is mainly responsible for functions such as UE authentication, UE mobility management, network slice selection, and SMF selection, serves as an anchor point for N1 and N2 signaling connections and provides routes for N1/N2 SM messages for an SMF, and maintains and manages UE status information.

A session management function (SMF) is mainly responsible for all control plane functions of UE session management, including selection of a user plane function (UPF), internet protocol (IP) address allocation, quality of service (QoS) management of a session, obtaining a policy and charging control (PCC) policy (from a PCF), and the like.

A UPF serves as an anchor point of a PDU session connection, and is responsible for data packet filtering, data transmission/forwarding, rate control, charging information generation, and the like for user equipment.

Unified data management (UDM) is mainly used to manage and control user data, for example, management of subscription information, including obtaining subscription information from a unified data repository (UDR) and providing the subscription information to another network element (for example, an AMF); generating an authentication credential of the 3rd generation partnership project (3GPP) for UE; and registering and maintaining a network element currently serving the UE, for example, an AMF currently serving the UE (that is, a serving AMF).

A network capability exposure function (network exposure function, NEF) is used to connect interaction between another internal network element of the core network and an external application server of the core network, to provide network capability information for the external application server, or provide information about the external application server for the core network element.

An application function (AF) interacts with a core network element to provide some services, for example, interacts with a policy and control function (PCF) to perform service policy control, interacts with an NEF to obtain some network capability information, or provide some application information for a network, and provides some data network access point information for a PCF to generate routing information of a corresponding data service.

An authentication server function (AUSF) is used to perform security authentication on UE when the UE accesses a network.

A network slice selection function (NSSF) is to select a slice instance set for UE and determine an AMF set and allowed NSSAI for the UE.

A policy control function (PCF) is used to provide configuration policy information for the UE, and provide policy information for a control plane network element (such as an AMF or an SMF) of a network to manage and control the UE.

Interfaces between network elements in FIG. 1 are shown in FIG. 1.

Figure 2:
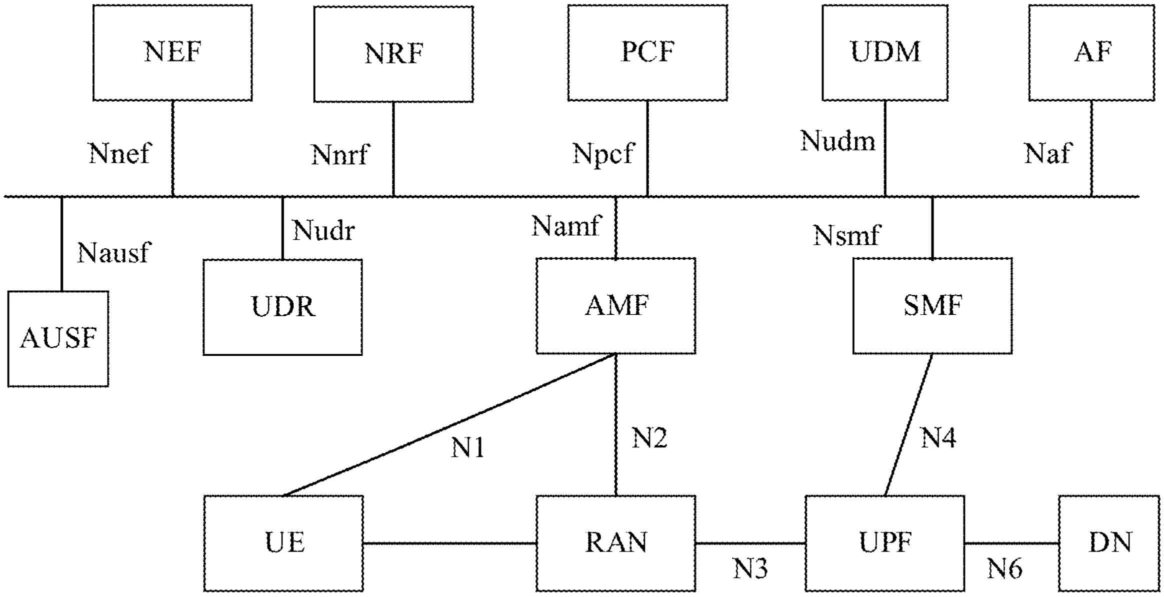
FIG. 2 is a schematic diagram of a service-based architecture.

FIG. 2 is a schematic diagram of a service-based architecture. As shown in FIG. 2, Nausf, Nnef, Npcf, Nudm, Naf, Namf, and Nsmf are respectively service-based interfaces provided by the AUSF, the NEF, the PCF, the UDM, the AF, the AMF, and the SMF, and are used to invoke corresponding service-based operations. N1, N2, N3, N4, and N6 are interface sequence numbers.

In FIG. 1 and FIG. 2, names and functions of the interfaces between the network elements are as follows:

(1) N1: This is an interface between an AMF and a terminal, and may be used to transfer a QoS control rule or the like to the terminal.

(2) N2: This is an interface between the AMF and a RAN, and may be used to transfer radio bearer control information or the like from a core network side to the RAN.

(3) N3: This is an interface between the RAN and a UPF, and is mainly used to transfer uplink and downlink user-plane data between the RAN and the UPF.

(4) N4: This is an interface between an SMF and the UPF, and may be used to transfer information between a control plane and a user plane, including delivering a forwarding rule, a QoS control rule, a traffic statistics rule, or the like from the control plane to the user plane, and reporting user-plane information.

(5) N5: This is an interface between an AF and a PCF, and may be used to deliver an application service request and report a network event.

(6) N6: This is an interface between the UPF and a DN, and is used to transfer uplink and downlink user data flows between the UPF and the DN.

(7) N7: This is an interface between the PCF and the SMF, and may be used to deliver control policies at a protocol data unit (protocol data unit, PDU) session granularity and a service data flow granularity.

(8) N8: This is an interface between the AMF and a UDM, and may be used by the AMF to obtain access and mobility management-related subscription data and authentication data from the UDM, used by the AMF to register current mobility management-related information of the terminal with the UDM, and the like.

(9) N9: This is a user-plane interface between UPFs, and is used to transfer uplink and downlink user data flows between the UPFs.

(10) N10: This is an interface between the SMF and the UDM, and may be used by the SMF to obtain session management-related subscription data from the UDM, used by the SMF to register current session-related information of the terminal with the UDM, and the like.

(11) N11: This is an interface between the SMF and the AMF, and may be used to transfer PDU session tunnel information between the RAN and the UPF, transfer a control message sent to the terminal, transfer radio resource control information sent to the RAN, and the like.

(12) N12: This is an interface between the AMF and an AUSF, and may be used by the AMF to initiate an authentication procedure to the AUSF, where a SUCI may be carried as a subscription identifier.

(13) N13: This is an interface between the UDM and the AUSF, and may be used by the AUSF to obtain a user authentication vector from the UDM, to perform the authentication procedure.

(14) N15: This is an interface between the PCF and the AMF, and may be used to deliver a terminal policy and an access control-related policy.

(15) N35: This is an interface between the UDM and a UDR, and may be used by the UDM to obtain user subscription data information from the UDR.

(16) N36: This is an interface between the PCF and the UDR, and may be used by the PCF to obtain policy-related subscription data and application data-related information from the UDR.

The network elements or the functions may be network elements in a hardware device, may be software functions running on dedicated hardware, or may be virtualized functions instantiated on a platform (for example, a cloud platform). Optionally, the network elements or functions may be implemented by one device, may be jointly implemented by a plurality of devices, or may be a function module in one device. This is not specifically limited in the embodiments of this application.

An access network device in the embodiments of this application may be a radio access network device.

In addition, the foregoing "network element" may also be referred to as an entity, a device, an apparatus, a module, or the like. This is not particularly limited in this application.

In addition, for ease of understanding and description, a description of the "network element" is omitted in some descriptions below. For example, an NEF network element is briefly referred to as an NEF. In this case, the "NEF" should be understood as an NEF network element or an NEF entity. Descriptions of same or similar cases are omitted below.

It should be understood that, FIG. 1 is merely an example of a network architecture, and a network architecture applicable to the embodiments of this application is not limited thereto. Any network architecture that can implement functions of the foregoing network elements is applicable to the embodiments of this application.

For example, in some network architectures, network function entities such as an AMF, an SMF, a PCF, and a UDM are all referred to as network function (NF) network elements; or in some other network architectures, a set of network elements such as an AMF, an SMF, a PCF, and a UDM may be referred to as control plane function (CPF) network elements.

The following uses a network element in a 5G system (5GS) as an example to describe specific solution details. It may be understood that, when the solution is used in an LTE system or a future communication system, each network element in the solution may be replaced with another network element having a corresponding function. This is not limited in this application.

With the evolution of communication technologies, in future wireless communication, when a RAN performs wireless communication by using a millimeter-wave band, the RAN naturally has a sensing capability similar to that of a radar, that is, the RAN has both a wireless communication capability and a sensing identification capability. Currently, the industry simply defines an end-to-end architecture for enabling a sensing service. Considering a current technical status, for example, sensing precision of a RAN network element for an area (that is, per area) may not meet some specific application requirements (for example, self-driving above L4), and there is no technology for sensing a single UE. Currently, there is no solution to sensing for specific UE in the industry.

Therefore, this application provides a UE sensing method.

Alternatively, in the embodiments of this application, sensing service data may be referred to as sensing data, sensing service data, or sensing application data.

The NEF network element in all the following embodiments may also be replaced with a gateway sensing center (GSC). That is, operations and/or processing performed by the NEF network element in the embodiments may be performed by the gateway sensing center.

The gateway sensing center is configured to receive a sensing request from a sensing demander (sensing client), and send the sensing request to a sensing network element.

1. An AF or an application server (AS) requests to sense UE.

Figure 3:
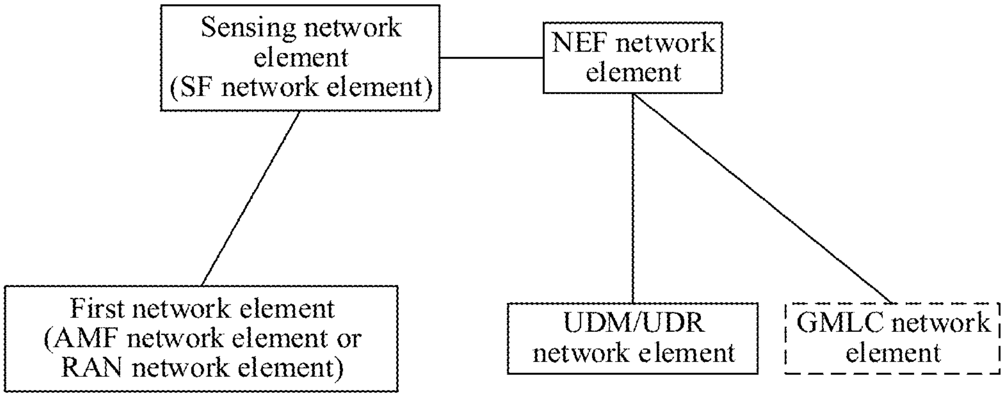
FIG. 3 is a diagram of an architecture of a communication system according to this application.

FIG. 3 is a diagram of an architecture of a communication system according to this application.

As shown in FIG. 3, the communication system may include an NEF network element, a UDM/UDR network element, a sensing network element, and a first network element (for example, an AMF network element, an SMF network element, or a RAN network element).

In this application, the sensing network element is a sensing function (SF) network element.

Figure 4A:
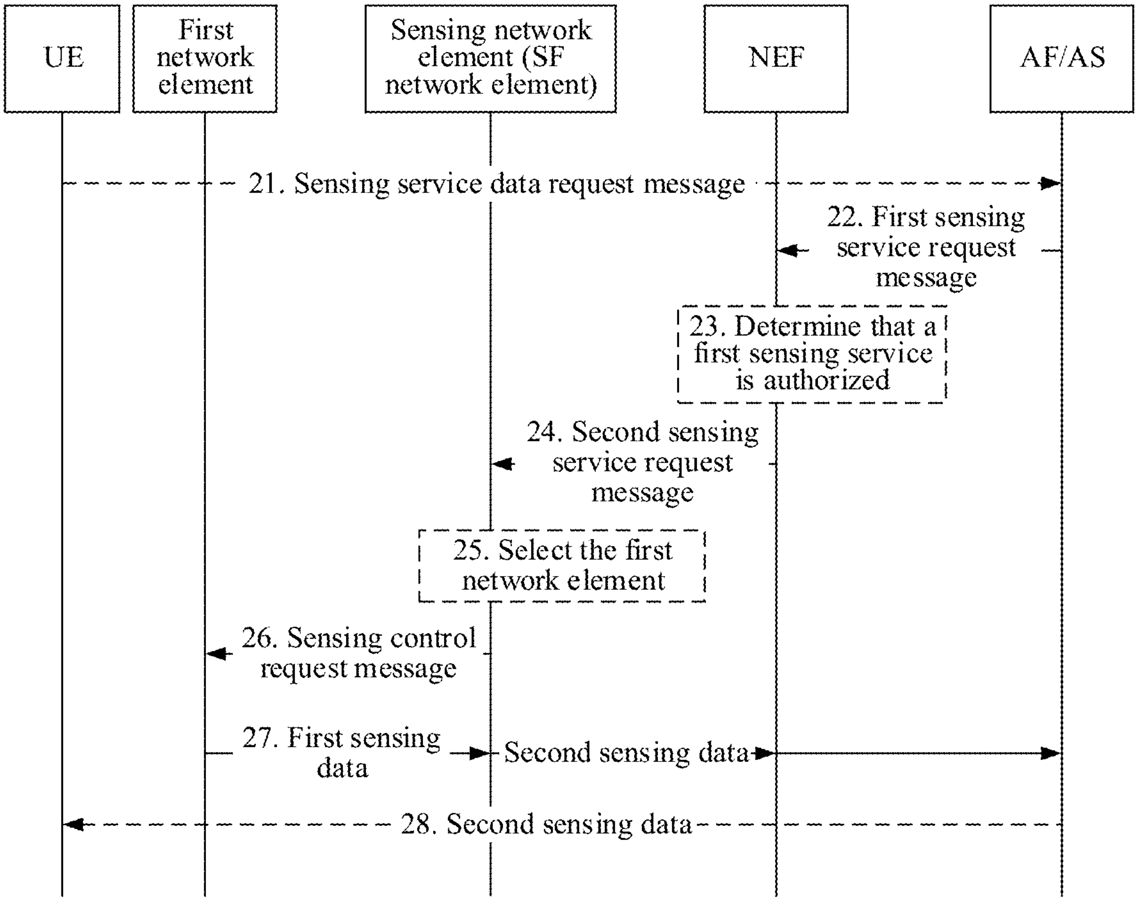
FIG. 4(*a*) is a schematic flowchart of a UE sensing method according to this application.
Figure 4B:
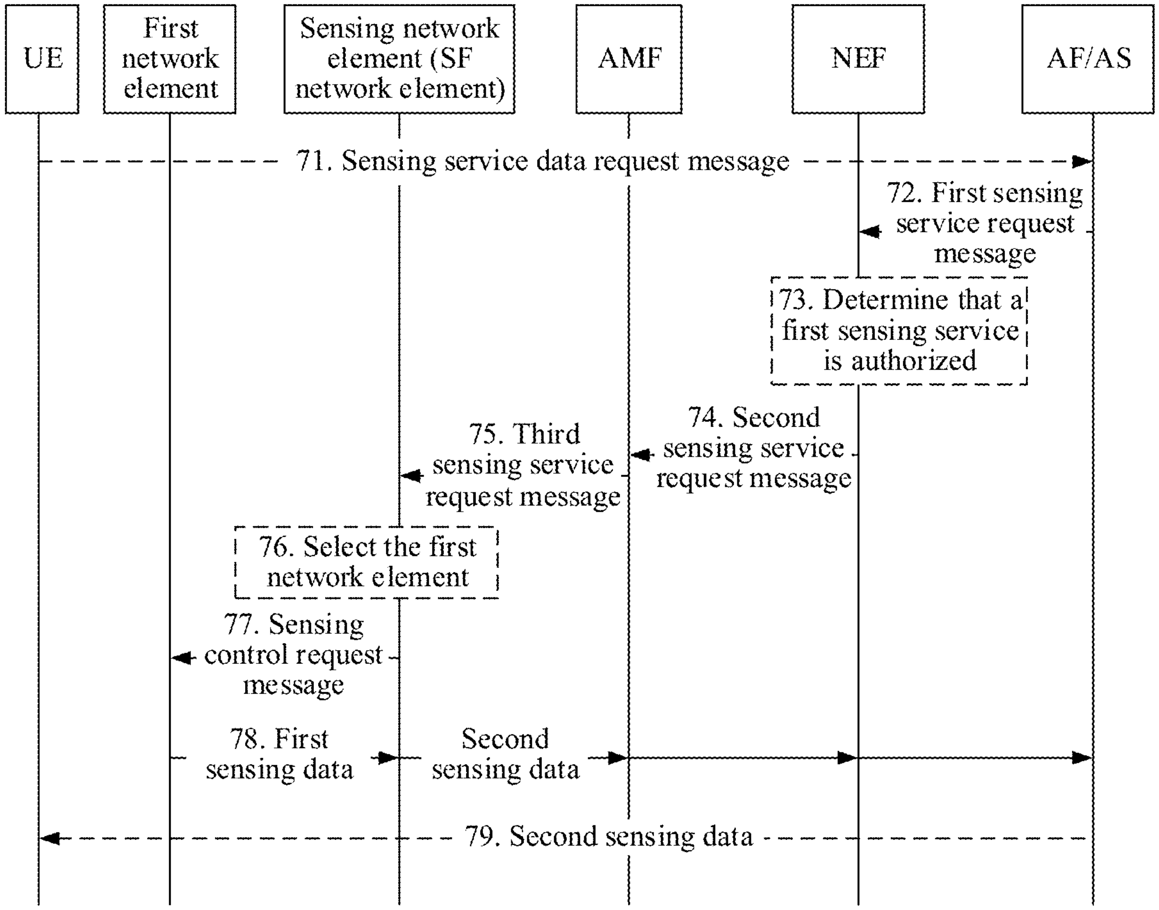

Based on the architecture in FIG. 3, this application provides a procedure for sensing UE shown in FIG. 4(*a*) and FIG. 4(*b*).

FIG. 4(*a*) is a schematic flowchart of a UE sensing method according to this application.

21. Optionally, a UE sends a sensing service data request message to an AF/AS.

22. The AF/AS sends a first sensing service request message to an NEF, where the first sensing service request message is used to request a first sensing service, and the first sensing service senses the UE. In other words, the first sensing service is a sensing service for sensing the UE.

The first sensing service request message includes a first identifier of the UE. For example, optionally, the first identifier may be an internal identifier, for example, a subscription permanent identifier (SUPI), of the UE. Alternatively, the first identifier may be an external identifier, for example, a generic public subscription identifier (GPSI), of the UE.

Optionally, the first sensing service request message further includes information such as a service type, a service requirement, a QoS requirement, and location information of the UE.

Alternatively, in the embodiments of this application, the service type is a sensing service type. The service requirement is a sensing requirement.

For example, the service requirement may include one or more of the following: a sensing distance, a sensing area, a sensing speed range, a sensing distance resolution, an angle measurement accuracy of sensing, a sensing speed resolution, a sensing quality of service QoS requirement, a sensing object identification accuracy, a sensing object identification false alarm rate, a sensing data accuracy, a sensing data update frequency, a sensing dimension, and a sensing feedback manner.

23. Optionally, the NEF network element determines that the first sensing service is authorized.

Specifically, the NEF network element may obtain service authorization information of the UE by using the UDM network element/UDR network element, and determine, based on the service authorization information of the UE, that the first sensing service of the UE is authorized.

The determining that the first sensing service of the UE is authorized may be understood as determining that the UE has sensing permission, or determining that the UE has permission for the sensing service.

24. The NEF network element sends a second sensing service request message to the SF network element, and the SF network element receives the second sensing service request message from the NEF network element.

The second sensing service request message is used to request the first sensing service, and the second sensing service request message includes a second identifier of the UE. For example, the second identifier is an internal identifier, for example, a SUPI, of the UE. The second identifier is obtained based on the first identifier.

Optionally, the second sensing service request message further includes information such as a service type, a service requirement, and a QoS requirement that are of the first sensing service.

Optionally, the NEF network element may request, based on the second identifier of the UE, a GMLC network element to obtain location information of the UE. Specifically, the NEF network element sends a location request message to the GMLC network element, where the location request message includes the second identifier of the UE. The GMLC network element returns a location response message to the NEF network element, where the location response message includes the location information of the UE. Optionally, the NEF sends the location information of the UE to the SF network element by using the second sensing service request message.

It should be understood that, the GMLC network element is a gateway mobile location center, and may be responsible for processing an external client location request. An external client requests the location information of the UE from the GMLC, and the GMLC requests a location of the UE from a positioning network element in a network. The location of the UE is provided to a requester or the external client of the location of the UE after the location of the UE is obtained.

In addition, for example, the positioning network element in the network may be a location management function (LMF), and may implement positioning of the UE.

25. The SF network element determines the first network element based on the second sensing service request message.

Optionally, the first network element may be an AMF network element, an SMF network element, or a RAN network element.

For clarity of description, the AMF network element determined in step 25 is referred to as a first AMF network element, the SMF network element determined in step 25 is referred to as a first SMF network element, and the RAN network element determined in step 25 is referred to as a first RAN network element below.

In an implementation, the first network element is an AMF network element.

As described above, in a possible implementation, the second sensing service request message includes the second identifier of the UE.

In this implementation, the SF network element determines the AMF network element based on the second identifier of the UE. Specifically, the SF network element determines an identifier of a serving AMF of the UE based on the second identifier of the UE, where the identifier is denoted as a serving AMF ID below.

In another possible implementation, the second sensing service request message may further include the location information of the UE.

Optionally, the SF network element may obtain the location information of the UE if the second sensing service request message does not include the location information of the UE.

For example, the SF network element may obtain the location information of the UE from the GMLC, the AMF network element, or the LMF. For example, the SF network element sends a location request message to the GMLC, the AMF, or the LMF, where the UE location request message includes a UE ID. The GMLC, AMF, or LMF initiates positioning of the UE based on the location request message, to obtain a location of the UE, and provides the location for the SF network element.

In this implementation, the SF network element determines the AMF based on the location information of the UE. In this case, the determined AMF may be a serving AMF of the UE or may not be the serving AMF of the UE.

It can be learned that, if the first network element determined in step 25 is the AMF network element, the AMF network element may be a serving AMF of the UE or may not be the serving AMF of the UE.

In an implementation, the first network element is an SMF network element.

As described above, in a possible implementation, the second sensing service request message includes the second identifier of the UE.

In this implementation, the SF network element determines the SMF network element based on the second identifier of the UE. Specifically, the SF network element determines an identifier of a serving SMF of the UE based on the second identifier of the UE, where the identifier is denoted as a serving SMF ID below.

In another possible implementation, the second sensing service request message may further include the location information of the UE.

In this implementation, the SF network element determines the SMF based on the second identifier of the UE and/or the location information of the UE. In this case, the determined SMF may be a serving SMF of the UE, or may not be a serving SMF of the UE.

It can be learned that, if the first network element determined in step 25 is the SMF network element, the SMF network element may be a serving SMF of the UE, or may not be a serving SMF of the UE.

26. The SF network element sends a sensing control request message to the first network element. The sensing control request message is used to control the RAN network element to perform a sensing operation of the first sensing service.

Optionally, in an implementation, if the SF network element determines the first RAN network element in step 25, the SF network element sends a first sensing control request message to the first RAN in step 26.

Optionally, in another implementation, if the SF network element determines the first AMF network element in step 25, in step 26, the SF network element sends a first sensing control request message to the first AMF, and the AMF network element further sends a second sensing control request message to the first RAN network element.

Optionally, in another implementation, if the SF network element determines the first SMF network element in step 25, in step 26, the SF network element sends a first sensing control request message to the first SMF, and the SMF network element further sends a second sensing control request message to the first RAN network element.

The first RAN network element performs the sensing operation of the first sensing service based on the first control request message or the second control request message, to obtain first sensing data of the first sensing service.

27. The first network element reports the first sensing data to the SF network element. The SF network element returns second sensing data to the AF/AS by using the NEF network element.

Optionally, the second sensing data is obtained based on the first sensing data, or the second sensing data is the first sensing data.

Further, an optional step 28 is further included.

28. The AF/AF sends the second sensing data to the UE.

As described above, based on the procedure shown in FIG. 4(*a*), the sensing service for sensing the UE may be provided. Optionally, the NEF network element performs an authorization check on the first sensing service requested by the AF/AS (where the first sensing service senses the UE), and provides the first sensing service when determining that the first sensing service is authorized, to ensure that a 5GS provides a sensing service only for the UE that has sensing permission. Therefore, in this embodiment, sensing detection can be performed on the UE, and a privacy security requirement of the UE is ensured.

FIG. 4(*b*) is a schematic flowchart of a UE sensing method according to this application.

71. Optionally, UE sends a sensing service data request message to an AF/AS.

72. The AF/AS sends a first sensing service request message to an NEF, where the first sensing service request message is used to request a first sensing service.

73. Optionally, the NEF network element determines that the first sensing service is authorized.

Optionally, the NEF network element obtains location information of the UE.

For example, the NEF network element sends a location request message to a GMLC or an LMF, where the location request message includes an identifier of the UE. The GMLC or the LMF returns a location response message to the NEF network element, where the location response message includes the location information of the UE. Optionally, the NEF sends the location information of the UE to an AMF network element by using a second sensing service request message in the following step.

For step 71 to step 73, refer to step 21 to step 23.

74. The NEF network element sends the second sensing service request message to the AMF network element, where the second sensing service request message is used to request the first sensing service.

Optionally, the second sensing service request message includes the location information of the UE.

Optionally, the AMF network element may obtain the location information of the UE by itself if the second sensing service request message does not include the location information of the UE.

For example, the AMF network element sends a location request message to the GMLC or the LMF, where the location request message includes the identifier of the UE. The GMLC or the LMF returns a location response message to the NEF network element, where the location response message includes the location information of the UE. Optionally, the AMF sends the location information of the UE to an SF network element by using a third sensing service request message in the following step.

Optionally, the second sensing service request message may further include one or more of the identifier (a second identifier) of the UE, a service type, a service requirement, and a QoS requirement.

75. The AMF network element sends the third sensing service request message to the SF network element.

The third sensing service request message is used to request the first sensing service, and the third sensing service request message includes the second identifier of the UE. For example, the second identifier is an internal identifier, for example, a SUPI, of the UE.

Optionally, the third sensing service request message further includes one or more of the location information of the UE, a service type, a service requirement, and a QoS requirement.

Optionally, the SF network element may obtain the location information of the UE by itself if the third sensing service request message does not include the location information of the UE.

For example, the SF network element sends a location request message to the GMLC or the LMF, where the location request message includes the identifier of the UE. The GMLC or the LMF returns a location response message to the NEF network element, where the location response message includes the location information of the UE.

76. Optionally, the SF network element determines a first network element based on the third sensing service request message.

Optionally, the first network element may be an AMF network element, an SMF network element, or a RAN network element.

For step 76, refer to content of determining the first AMF, determining the first RAN, or determining the first SMF in step 25.

77. The SF network element sends a sensing control request message to the first network element. The sensing control request message is used to control the RAN network element to perform a sensing operation of the first sensing service.

Optionally, in an implementation, if the first network element in step 76 is the RAN network element (for example, the first RAN), the SF network element sends a first sensing control request message to the first RAN network element in step 77.

Optionally, in another implementation, if the first network element in step 76 is the AMF network element (for example, the first AMF), in step 77, the SF network element sends a first sensing control request message to the first AMF network element, and the first AMF network element further sends a second sensing control request message to the first RAN network element.

Optionally, in another implementation, if the SF network element determines the first SMF network element in step 76, in step 77, the SF network element sends a first sensing control request message to the first SMF, and the first SMF network element further sends a second sensing control request message to the first RAN network element.

The RAN network element (namely, the first RAN network element) performs the sensing operation of the first sensing service based on the first control request message or the second control request message, to obtain first sensing data of the first sensing service.

78. The RAN network element reports the first sensing data to the SF network element. The SF network element returns second sensing data to the AF/AS by using the AMF network element and the NEF network element.

Optionally, the second sensing data is obtained based on the first sensing data, or the second sensing data is the first sensing data.

Further, an optional step 79 is further included.

79. The AF/AF sends the second sensing data to the UE.

As described above, based on the procedure shown in FIG. 4(*b*), a sensing service for sensing the UE may be provided. Optionally, the NEF network element performs an authorization check on the first sensing service requested by the AF/AS, and provides the first sensing service when determining that the first sensing service is authorized, to ensure that a 5GS provides a sensing service only for UE that has sensing permission.

In the procedure shown in FIG. 4(*b*), the NEF network element performs the authorization check on the first sensing service. Optionally, the AMF network element may perform the authorization check on the first sensing service, and this is not limited.

Figure 5:
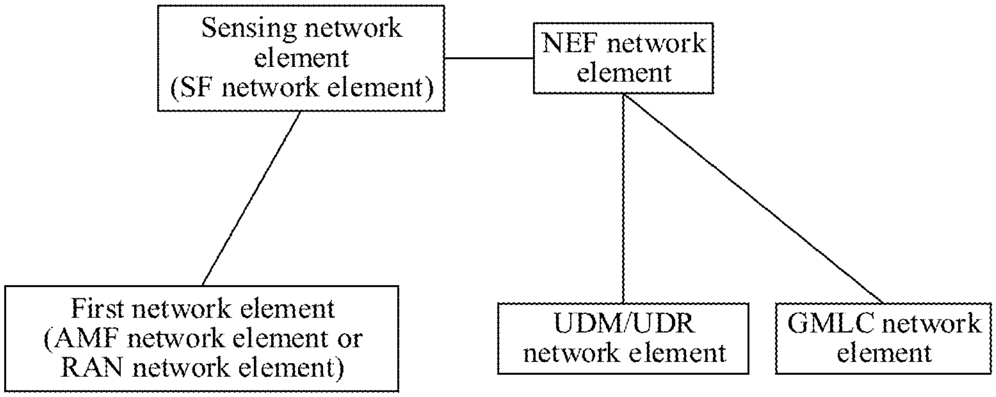
FIG. 5 is a diagram of an architecture of another communication system according to this application.

FIG. 5 is a diagram of an architecture of another communication system according to this application.

As shown in FIG. 5, the communication system may include an NEF network element, a UDM network element/UDR network element, an SF network element, a first network element (for example, an AMF network element or a RAN network element), and a GMLC network element.

Figure 6A:
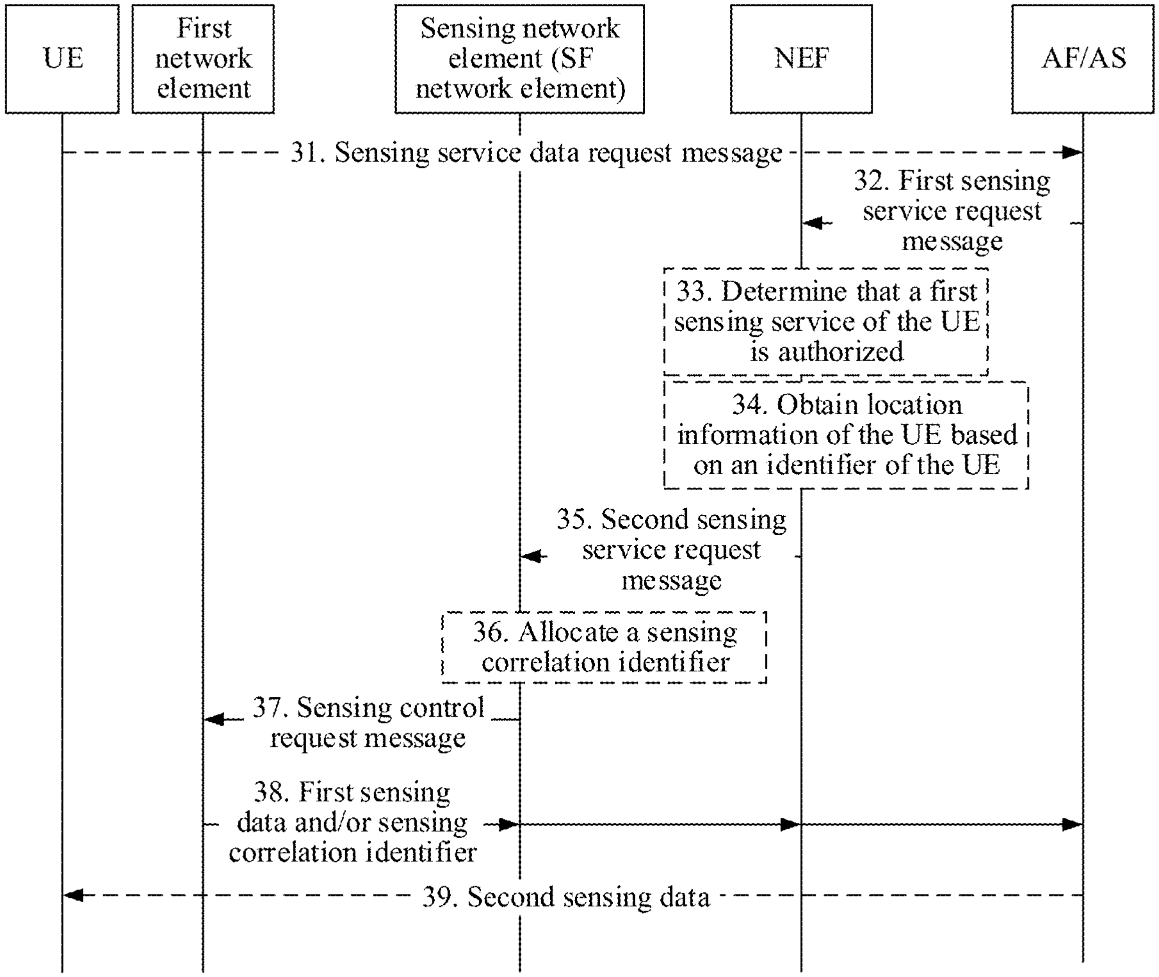
FIG. 6(*a*) is a schematic flowchart of a UE sensing method according to this application.
Figure 6B:
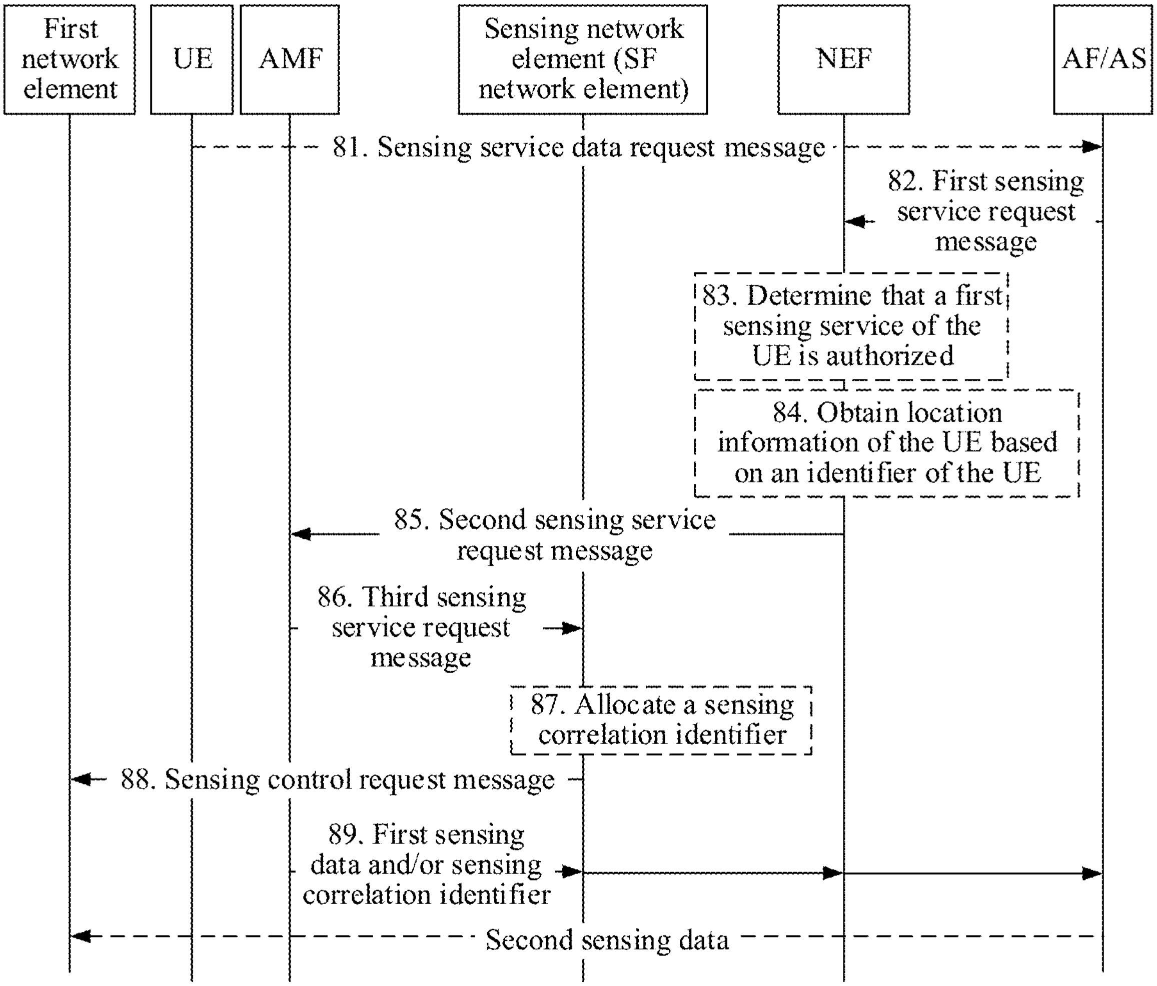
Figure 6C:
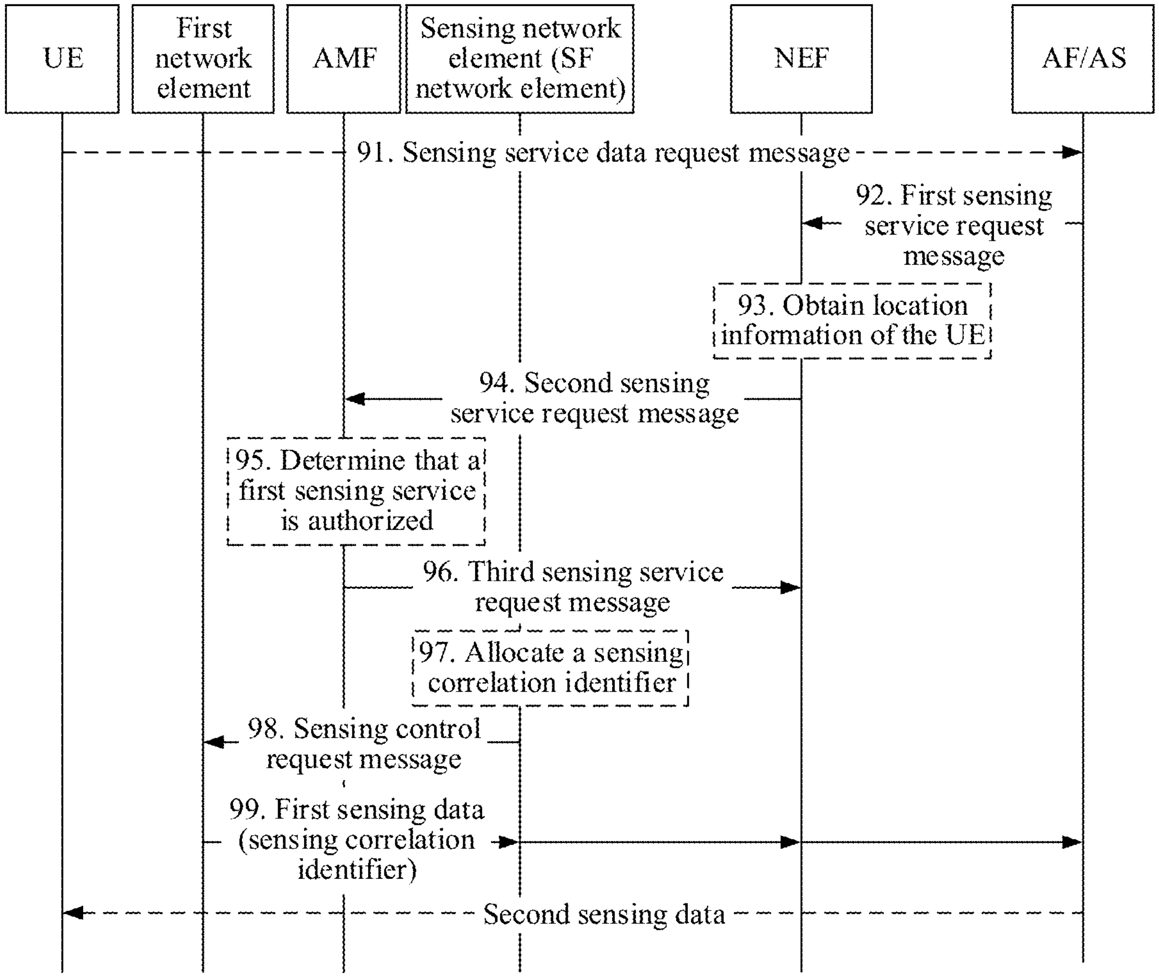

Based on the architecture in FIG. 5, this application provides a procedure for sensing UE shown in FIG. 6.

FIG. 6(*a*) is a schematic flowchart of a UE sensing method according to this application.

31. Optionally, the UE sends a sensing service data request message to an AF/AS.

32. The AF/AS sends a first sensing service request message to an NEF.

The first sensing service request message is used to request the first sensing service, and the first sensing service request message includes an identifier of the UE.

Optionally, the first sensing service request message further includes information such as a service type, a service requirement, and a QoS requirement.

Optionally, the service requirement may include one or more of the following:

a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

33. Optionally, the NEF network element determines that the first sensing service is authorized.

Specifically, the NEF network element may obtain service authorization information of the UE by using a UDM network element/UDR network element, and determine, based on the service authorization information, that the first sensing service of the UE is authorized.

For step 31 to step 33, refer to step 21 to step 23.

34. Optionally, the NEF network element obtains location information of the UE based on the identifier of the UE.

In an implementation, the NEF network element obtains the location information of the UE from a GMLC.

Specifically, the NEF network element may send a location request message to the GMLC network element, where the location request message includes the identifier of the UE. The GMLC initiates positioning of the UE based on the location request message, to obtain a location of the UE. The GMLC network element sends a location response message to the NEF network element, where the location response message includes the location information of the UE.

In another implementation, the NEF network element requests to obtain the location information of the UE from the LMF network element.

Specifically, the NEF network element sends the location request message to the LMF network element, where the location request message includes the identifier of the UE. The LMF network element initiates positioning of the UE based on a request of the NEF network element, to obtain the location of the UE, and returns the location information of the UE to the NEF network element.

In another implementation, the NEF network element obtains the location information of the UE from an AMF network element.

Specifically, the NEF network element sends a location request message to the AMF network element, where the location request message includes the identifier of the UE. The AMF network element requests, based on the location request message, to obtain the location of the UE from an LMF network element. The LMF network element initiates positioning of the UE based on a request of the AMF network element, to obtain a location of the UE, and returns the location information of the UE to the AMF network element. The AMF network element further provides the location information of the UE for the NEF network element.

35. The NEF network element sends a second sensing service request message to an SF network element, where the second sensing service request message is used to request the first sensing service.

Optionally, the second sensing service request message includes one or more of the location information of the UE, the identifier of the UE, a service type, a service requirement, and a QoS requirement.

Optionally, the service requirement may include one or more of the following:

a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

Optionally, if the second sensing service request message does not include the location information of the UE, that is, the NEF network element does not provide the location information of the UE for the SF network element, the SF network element may obtain the location information of the UE by itself.

For example, the SF network element may obtain the location information of the UE from the GMLC, the AMF network element, or the LMF. For example, the SF network element sends a location request message to the GMLC, the AMF, or the LMF, where the UE location request message includes a UE ID. The GMLC, AMF, or LMF initiates positioning of the UE based on the location request message, to obtain a location of the UE, and provides the location for the SF network element.

36. Optionally, the SF network element allocates a sensing correlation identifier.

Optionally, the sensing correlation identifier is used to identify sensing data of the UE. That is, the sensing association identifier is an identifier of a UE granularity and is used to distinguish between sensing data of different UEs.

Optionally, the sensing correlation identifier is used to identify sensing data of the first sensing service of the UE. That is, the sensing correlation identifier is an identifier of a sensing service granularity and may distinguish between sensing data of different sensing services of one UE.

Alternatively, the sensing association identifier may be of another granularity, and this is not limited.

It should be understood that, when subsequently reporting sensing data of the UE by using a per-UE data channel, the SF network element may not need to sense the association identifier, but may need location information of the UE. By using the data reported by the per-UE data channel, a receive end may know that the data is the sensing data of the UE.

37. The SF network element sends a sensing control request message to the first network element.

Optionally, the sensing control request message includes the location information of the UE and/or the sensing correlation identifier.

It can be learned from the foregoing description that the location information of the UE is used by a RAN to perform a sensing operation, so that the RAN does not need to perform sensing based on the identifier of the UE, and privacy of the UE can be protected.

The sensing correlation identifier is carried when the sensing data is reported, so that the SF and a subsequent node can identify that the sensing data belongs to the UE or the first sensing service of the UE.

38. The SF network element receives first sensing data of the first sensing service from the first network element. Optionally, the SF network element further receives the sensing correlation identifier if the sensing control request message in step 37 includes the sensing correlation identifier.

Optionally, an optional step 39 is further included.

39. The UE receives second sensing data of the first sensing service.

Specifically, the SF network element sends the second sensing data to the AF/AS by using the NEF network element after obtaining the first sensing data of the first sensing service. Optionally, the second sensing data is obtained based on the first sensing data, or the second sensing data is the first sensing data. Further, the AF/AS sends the second sensing data to the UE.

As described above, based on the procedure shown in FIG. 6(*a*), the sensing service for sensing the UE may be provided. Optionally, the NEF network element performs an authorization check on the first sensing service requested by the AF or the AS. Optionally, the NEF network element converts sensing of the UE ID into sensing of a location point of the UE. This not only can ensure that a 5GS provides a sensing service only for the UE that has sensing permission, but also can avoid that the RAN network element is involved in user security and privacy, thereby enhancing privacy protection of the sensing service.

FIG. 6(*b*) is a schematic flowchart of a UE sensing method according to this application.

81. Optionally, UE sends a sensing service data request message to an AF/AS.

82. The AF/AS sends a first sensing service request message to an NEF.

The first sensing service request message is used to request the first sensing service, and the first sensing service request message includes an identifier of the UE.

Optionally, the first sensing service request message further includes information such as a service type, a service requirement, and a QoS requirement.

Optionally, the service requirement may include one or more of the following: a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

83. Optionally, the NEF network element determines that the first sensing service is authorized.

Specifically, the NEF network element may determine, by using a UDM network element/UDR network element, that the first sensing service of the UE is authorized.

84. Optionally, the NEF network element obtains location information of the UE based on the identifier of the UE.

For example, the NEF network element may obtain the location information of the UE from a GMLC network element, an LMF network element, or an AMF network element.

For example, the NEF network element may send a location request message to the GMLC network element or the LMF network element, where the location request message includes the identifier of the UE. The GMLC network element or the LMF network element initiates positioning of the UE based on the location request message, to obtain a location of the UE. The GMLC network element or the LMF network element sends a location response message to the NEF network element, where the location response message includes the location information of the UE.

Alternatively, the NEF network element obtains the location information of the UE from the AMF network element.

Specifically, the NEF network element sends a location request message to the AMF network element, where the location request message includes the identifier of the UE. The AMF network element requests, based on the location request message, to obtain the location of the UE from the LMF network element. The LMF network element initiates positioning of the UE based on a request of the AMF network element, to obtain a location of the UE, and returns the location information of the UE to the AMF network element. The AMF network element further provides the location information of the UE for the NEF network element. For step 81 to step 84, refer to step 31 to step 34.

85. The NEF network element sends a second sensing service request message to the AMF network element, where the second sensing service request message is used to request the first sensing service.

Optionally, the second sensing service request message includes one or more of the location information of the UE, the identifier of the UE, a service type, a service requirement, and a QoS requirement.

Optionally, the service requirement may include one or more of the following:

a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

Optionally, if the second sensing service request message does not include the location information of the UE, that is, the NEF network element does not provide the location information of the UE for the AMF network element, the AMF network element may obtain the location information of the UE by itself.

For example, the AMF network element may obtain the location information of the UE from the GMLC or the LMF.

For example, the AMF network element sends a location request message to the GMLC or the LMF, where the UE location request message includes a UE ID. The GMLC or LMF initiates positioning of the UE based on the location request message, to obtain a location of the UE, and provides the location for the AMF network element.

86. The AMF network element sends a third sensing service request message to the SF network element, where the third sensing service request message is used to request the first sensing service.

Optionally, the third sensing service request message includes one or more of location information of the UE, the identifier of the UE, a service type, a service requirement, and a QoS requirement.

Optionally, the service requirement may include one or more of the following:

a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

Optionally, if the third sensing service request message does not include the location information of the UE, that is, the AMF network element does not provide the location information of the UE for the SF network element, the SF network element may obtain the location information of the UE by itself.

For example, the SF network element may send a location request message to the GMLC or the LMF, where the location request message includes the identifier of the UE. The GMLC or the LMF returns a location response message to the NEF network element, where the location response message includes the location information of the UE.

87. Optionally, the SF network element allocates a sensing correlation identifier.

For the sensing association identifier, refer to the description in step 36 above, and details are not described herein again.

88. The SF network element sends a sensing control request message to a first network element.

Optionally, the sensing control request message includes the location information of the UE and/or the sensing correlation identifier.

89. The SF network element receives first sensing data of the first sensing service from the first network element. Optionally, the SF network element further receives the sensing correlation identifier if the sensing control request message in step 87 includes the sensing correlation identifier.

Optionally, the first network element may be the AMF network element, an SMF network element, or a RAN network element.

Optionally, the SF network element sends a first sensing control request message to the RAN network element if the first network element is the RAN network element.

Optionally, the SF network element sends a first sensing control request message to the AMF if the first network element is the AMF network element, and the AMF network element further sends a second sensing control request message to the RAN network element.

Optionally, the SF network element sends a first sensing control request message to the SMF network element if the first network element is the SMF network element, and the SMF network element further sends a second sensing control request message to the RAN network element.

The RAN network element performs a sensing operation of the first sensing service based on the first control request message or the second control request message, to obtain the first sensing data of the first sensing service.

The RAN network element reports the first sensing data to the SF network element, and the SF network element returns second sensing data to the AF/AS by using the NEF network element. Optionally, the AF/AS sends the second sensing data to the UE.

As described above, based on the procedure shown in FIG. 6(*b*), the sensing service for sensing the UE may be provided. In addition, optionally, the NEF network element performs an authorization check on the first sensing service requested by the AF or the AS. Optionally, the NEF network element converts sensing of the UE ID into sensing of a location point of the UE. This not only can ensure that a 5GS provides a sensing service only for UE that has sensing permission, but also can avoid that the RAN network element is involved in user security and privacy, thereby enhancing privacy protection of the sensing service.

In FIG. 6(*a*) and FIG. 6(*b*), the NEF network element performs the authorization check on the first sensing service requested by the AF/AS. Optionally, in another implementation, the AMF network element may perform an authorization check on the first sensing service requested by the AF/AS, as shown in FIG. 6(*c*).

FIG. 6(*c*) is a schematic flowchart of a UE sensing method according to this application.

91. Optionally, UE sends a sensing service data request message to an AF/AS.

92. The AF/AS sends a first sensing service request message to an NEF.

The first sensing service request message is used to request the first sensing service, and the first sensing service request message includes an identifier of the UE.

Optionally, the first sensing service request message further includes information such as a service type, a service requirement, and a QoS requirement.

Optionally, the service requirement may include one or more of the following:

a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

93. Optionally, the NEF network element obtains location information of the UE.

94. The NEF network element sends a second sensing service request message to an AMF network element, where the second sensing service request message is used to request the first sensing service.

Optionally, the second sensing service request message includes one or more of the location information of the UE, the identifier of the UE, a service type, a service requirement, and a QoS requirement.

Optionally, the service requirement may include one or more of the following:

a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

95. Optionally, the AMF network element determines that the first sensing service is authorized.

For example, the AMF network element may request to obtain service authorization information of the UE from a UDM/UDR network element, and determine, based on the service authorization information, that the first sensing service is authorized.

Optionally, if the second sensing service request message does not include the location information of the UE, that is, the NEF network element does not provide the location information of the UE for the AMF network element, the AMF network element may obtain the location information of the UE by itself.

For example, the AMF network element may obtain the location information of the UE from a GMLC or an LMF.

For example, the AMF network element sends a location request message to the GMLC or the LMF, where the UE location request message includes a UE ID. The GMLC or LMF initiates positioning of the UE based on the location request message, to obtain a location of the UE, and provides the location for the AMF network element.

96. The AMF network element sends a third sensing service request message to the SF network element, where the third sensing service request message is used to request the first sensing service.

Optionally, the third sensing service request message includes one or more of location information of the UE, the identifier of the UE, a service type, a service requirement, and a QoS requirement.

Optionally, the service requirement may include one or more of the following:

a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

Optionally, if the third sensing service request message does not include the location information of the UE, that is, the AMF network element does not provide the location information of the UE for the SF network element, the SF network element may obtain the location information of the UE by itself.

For example, the SF network element may send a location request message to the GMLC or the LMF, where the location request message includes the identifier of the UE. The GMLC or the LMF returns a location response message to the NEF network element, where the location response message includes the location information of the UE.

97. Optionally, the SF network element allocates a sensing correlation identifier.

98. The SF network element sends a sensing control request message to a first network element.

Optionally, the sensing control request message includes the location information of the UE and/or the sensing correlation identifier.

99. The SF network element receives first sensing data of the first sensing service from the first network element. Optionally, the SF network element further receives the sensing correlation identifier if the sensing control request message in step 98 includes the sensing correlation identifier.

Optionally, the first network element may be the AMF network element, a RAN network element, or an SMF network element.

Further, the SF network element returns second sensing data to the AF/AS by using the AMF network element and the NEF network element. Optionally, the AF/AS sends the second sensing data to the UE.

As described above, based on the procedure shown in FIG. 6(*c*), the sensing service for sensing the UE may be provided. In addition, optionally, the AMF network element performs an authorization check on the first sensing service requested by the AF or the AS. Optionally, the NEF network element, the AMF network element, or the SF network element converts sensing of the UE ID into sensing of a location point of the UE. This not only can ensure that a 5GS provides a sensing service only for a UE that has sensing permission, but also can avoid that the RAN network element becomes involved in security and privacy of the UE when sensing the UE, thereby enhancing privacy protection of the sensing service.

2. The UE directly requests service data from a 5GS.

Figure 7:
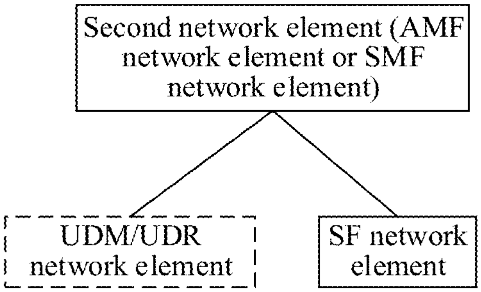
FIG. 7 is a diagram of an architecture of another communication system according to this application.

FIG. 7 is a diagram of an architecture of another communication system according to this application.

As shown in FIG. 7, the communication system may include an SF network element and a second network element (an AMF network element or an SMF network element). Optionally, a UDM/UDR network element is further included.

Figure 8:
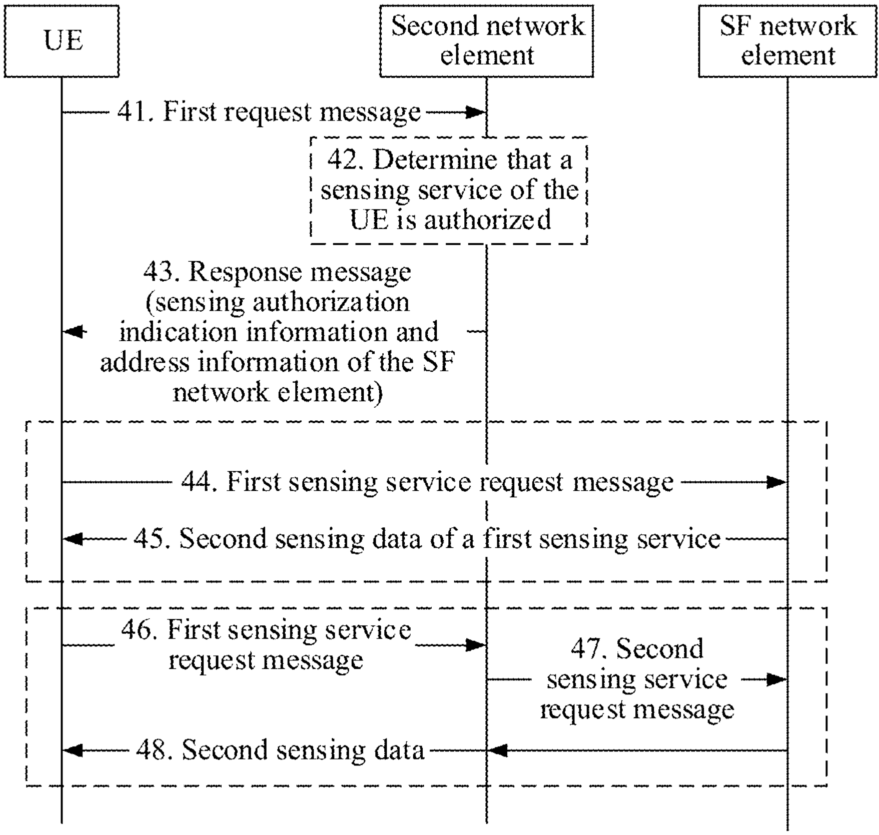
FIG. 8 is a schematic flowchart of another UE sensing method according to this application.

Based on the architecture in FIG. 7, this application provides a procedure of providing a sensing service for UE shown in FIG. 8.

FIG. 8 is a schematic flowchart of another method for providing a sensing service for a UE according to this application.

41. The second network element receives a first request message from the UE. The first request message is used to request the sensing service.

Optionally, the first request message carries sensing indication information, where the sensing indication information indicates that the first request message requests a sensing service.

Optionally, the first request message further includes one or more of a UE ID, a service type, a service requirement, and a QoS requirement.

Optionally, the service requirement may include one or more of the following:

a sensing service type, a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

Optionally, the second network element is the AMF network element or the SMF network element.

42. Optionally, the second network element determines that the sensing service of the UE is authorized.

In an implementation, the second network element stores subscription information of the UE, where the subscription information includes service authorization information of the UE. The second network element determines, based on the service authorization information of the UE, that the sensing service of the UE is authorized.

In an implementation, if the second network element does not store the subscription information of the UE, the second network element may request to obtain the subscription information of the UE from a UDM/UDR network element, to obtain the service authorization information of the UE. The second network element determines, based on the service authorization information of the UE, that the sensing service of the UE is authorized.

Optionally, the service authorization information includes first sensing authorization indication information and/or a first sensing authorization parameter.

The first sensing authorization indication information indicates that the sensing service of the UE is authorized.

Optionally, the first sensing authorization parameter includes one or more of the following:

a sensing service type, a sensing distance, a sensing area, a sensing speed range, a sensing distance resolution, an angle measurement accuracy of sensing, a sensing speed resolution, a sensing quality of service QoS requirement, a sensing object identification accuracy, a sensing object identification false alarm rate, a sensing data accuracy, a sensing data update frequency, a sensing dimension, a sensing feedback manner, a sensing requester type, a sensing requester identifier, a sensing application type, and a sensing application identifier.

For example, the sensing requester type may be public security, firefighting, an enterprise, an individual, or the like. For different sensing requester types, a RAN network element may use different priorities when performing sensing.

43. The second network element sends a response message of the first request message to the UE, where the response message indicates that the sensing service of the UE is authorized.

Optionally, the response message includes sensing accept indication information, and the sensing accept indication information indicates that the sensing service of the UE is accepted. That is, the sensing accept indication information indicates that the sensing service of the UE is authorized.

Optionally, the response message further includes address information of a sensing network element (for example, the SF network element).

In an implementation, the response message includes the address information of the sensing network element. In this case, step 44 and step 45 are performed after step 43.

Implementation 1

44. The UE sends a first sensing service request message to the SF network element by using a user plane connection based on the address information of the SF network element.

The first sensing service request message is used to request a first sensing service. The first sensing service request message includes an identifier of the UE. Optionally, the first sensing service request message may further include one or more of a service type, a service requirement, and a QoS requirement.

45. The UE receives sensing data (for example, the second sensing data in the foregoing embodiment) of the first sensing service from the SF network element.

In another implementation, the response message includes sensing accept indication information, but does not include the address information of the sensing network element. In this case, step 46 and step 47 are performed after step 43.

Implementation 2

46. The UE sends a first sensing service request message to the second network element, where the first sensing service request message is used to request a first sensing service.

Optionally, the first sensing service request message includes one or more of an identifier of the UE, a service type, a service requirement, and a QoS requirement.

47. The second network element sends a second sensing service request message to the SF network element, where the second sensing service request message is used to request the first sensing service. Optionally, the second sensing service request message includes the identifier of the UE.

Optionally, the second sensing service request message further includes one or more of a service type, a service requirement, and a QoS requirement.

Optionally, the service requirement may include one or more of the following: a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

48. The UE receives second sensing data of the first sensing service from the SF network element.

As described above, the procedure shown in FIG. 8 provides the method for providing the sensing service for the UE. The second network element (the AMF network element or the SMF network element) performs an authorization check on the sensing service of the UE, and when determining that the sensing service of the UE is authorized, indicates to the UE, that the sensing service of the UE is authorized, and may indicate the address information of the sensing network element. Further, the UE may directly request the first sensing service from the sensing network element by using the user plane connection based on the address information of the sensing network element, and receive the second sensing data of the first sensing service from the sensing network element (for example, the procedure in Implementation 1). Alternatively, the UE requests the first sensing service from the SF network element by using the control plane, and receives the second sensing data of the first sensing service from the sensing network element (for example, the procedure in Implementation 2). In this embodiment, it not only can be ensured that a 5GS provides a sensing service only for UE that has sensing permission, but also can enhance privacy protection of the sensing service.

Figure 9:
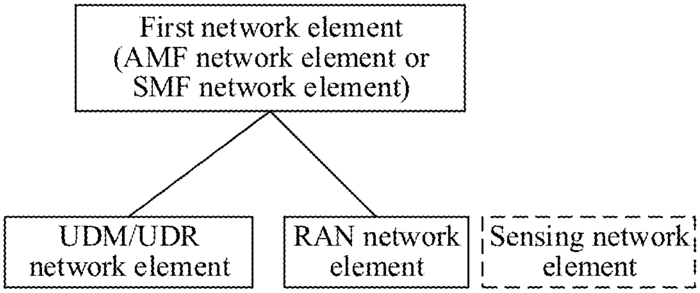
FIG. 9 is a diagram of an architecture of another communication system according to this application.

FIG. 9 is a diagram of an architecture of another communication system according to this application.

As shown in FIG. 9, the communication system may include a second network element (an AMF network element or an SMF network element), a UDM/UDR network element, and a RAN network element.

Figure 10:
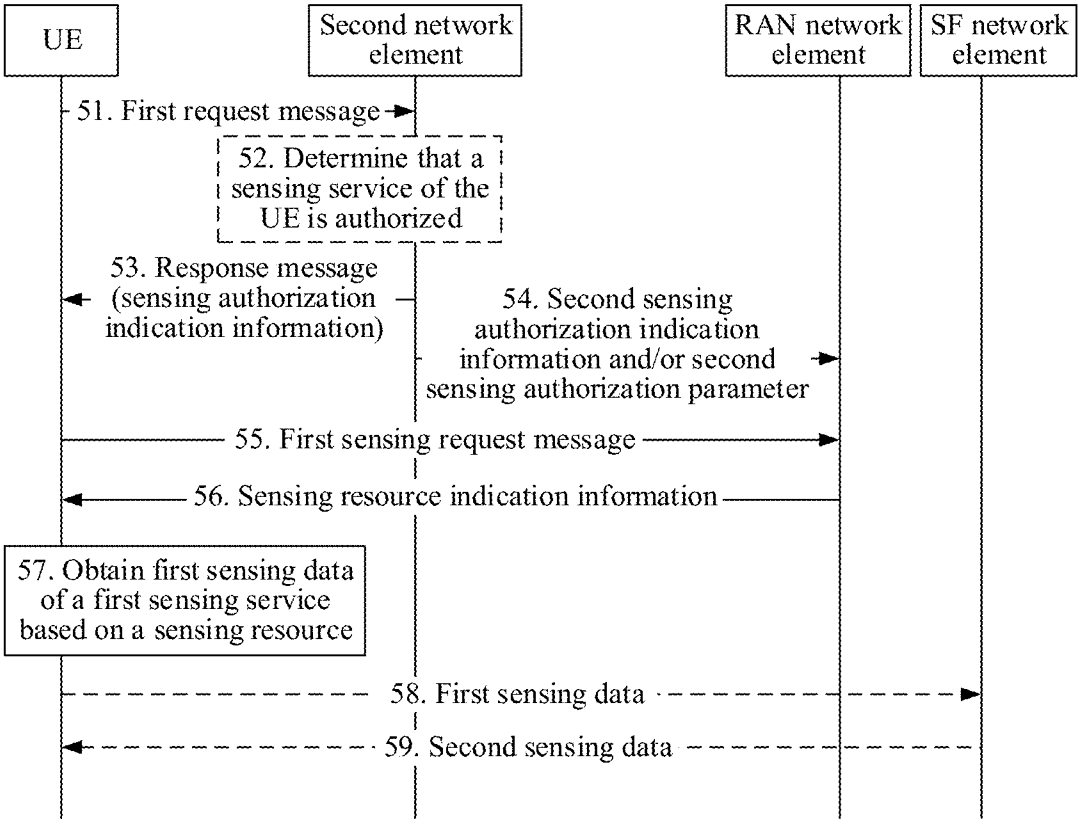
FIG. 10 is a schematic flowchart of another method for providing a sensing service for UE according to this application.

Based on the architecture in FIG. 9, this application provides a procedure of providing a sensing service for UE shown in FIG. 10. In other words, the procedure shown in FIG. 10 is a schematic flowchart of a UE sensing method.

FIG. 10 is a schematic flowchart of another method for providing a sensing service for UE according to this application.

51. The UE sends a first request message to a second network element. The first request message is used to request the sensing service.

Optionally, the first request message carries sensing indication information, where the sensing indication information indicates that the first request message is used to request the sensing service.

Optionally, the first request message further includes one or more of an identifier of the UE, a service type, a service requirement, and a QoS requirement.

Optionally, the service requirement may include one or more of the following:

a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

Optionally, the second network element is an AMF network element or an SMF network element.

52. Optionally, the second network element determines that the sensing service of the UE is authorized.

For example, in an implementation, the second network element may determine, by using a UDM/UDR network element, that the sensing service of the UE is authorized. Specifically, the second network element obtains subscription information of the UE from the UDM/UDR network element, where the subscription information includes service authorization information of the UE. The second network element determines, based on the service authorization information of the UE, that the sensing service of the UE is authorized.

53. The second network element sends a response message of the first request message to the UE, where the response message indicates that the sensing service of the UE is authorized.

Optionally, the response message includes sensing accept indication information, and the sensing accept indication information indicates that the sensing service of the UE is accepted.

54. The second network element sends second sensing authorization indication information and/or a second sensing authorization parameter to a RAN network element.

The second sensing authorization indication information and/or the second sensing authorization parameter are/is determined based on the service authorization information of the UE. As described above, the service authorization information may include first sensing authorization indication information and/or a first sensing authorization parameter. Specifically, the second sensing authorization indication information may be the first sensing authorization indication information. The second sensing authorization parameter is determined based on the first sensing authorization parameter. For the first sensing authorization parameter, refer to the example in step 42.

Optionally, the second sensing authorization parameter includes one or more of the following:

a sensing service type, a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

55. The UE sends a sensing request message to the RAN network element.

The sensing request message is used to request a sensing resource for the first sensing service of the UE, or the sensing request message is used to request the RAN network element to sense the UE.

Optionally, the sensing request message includes one or more of the identifier of the UE, a service type, a service requirement, and a QoS requirement.

Optionally, the service requirement includes one or more of the following:

a sensing distance, a sensing area, a sensing speed range, a sensing distance resolution, an angle measurement accuracy of sensing, a sensing speed resolution, the sensing quality of service QoS requirement, a sensing object identification accuracy, a sensing object identification false alarm rate, a sensing data accuracy, a sensing data update frequency, a sensing dimension, and a sensing feedback manner.

The RAN network element performs an authorization check on the first sensing service of the UE based on the second sensing authorization indication information and/or the second sensing authorization parameter that are/is received in step 54, and sends sensing resource indication information to the UE when confirming that the first sensing service of the UE is authorized.

56. The UE receives the sensing resource indication information from the RAN network element, where the sensing resource indication information indicates the sensing resource of the first sensing service of the UE.

57. The UE obtains first sensing data of the first sensing service based on the sensing resource.

In a possible implementation, the UE sends a sensing signal based on the sensing resource and receives an echo signal of the sensing signal to perform sensing, to obtain the first sensing data of the first sensing service.

In another possible implementation, the UE receives an echo signal of a sensing signal from the RAN network element based on the sensing resource and performs sensing, to obtain the first sensing data of the first sensing service.

In another possible implementation, the UE sends a sensing signal based on the sensing resource, and the RAN network element receives an echo signal of the sensing signal and performs sensing, to obtain the first sensing data of the first sensing service. The RAN network element sends the first sensing data to the UE, and the UE receives the first sensing data from the RAN network element.

Alternatively, the echo signal may also be referred to as a reflected signal.

In addition, optionally, the UE may further send the first sensing data to a sensing network element after obtaining the first sensing data, where the first sensing data may be used by the sensing network element, as shown in step 58 below.

In addition, it is considered that a data processing capability of the UE is limited, and the UE may further send the first sensing data to the sensing network element after obtaining the first sensing data, and receive second sensing data from the sensing network element. The second sensing data is obtained by processing the first sensing data, for example, in step 58 and step 59.

58. The UE sends the first sensing data to the sensing network element.

59. The UE receives the second sensing data from the sensing network element.

As shown above, the procedure shown in FIG. 10 provides the method for providing the sensing service for the UE. The second network element (the AMF network element or the SMF network element) performs an authorization check on the sensing service of the UE, and when determining that the sensing service of the UE is authorized, indicates to the UE, that the sensing service is authorized. Further, the UE obtains the sensing resource from the RAN network element, and performs sensing based on the sensing resource, to obtain the sensing data. Alternatively, the UE sends the sensing signal based on the sensing resource, the RAN network element receives the sensing signal and obtains the sensing data, and the RAN network element further provides the obtained sensing data for the UE. Alternatively, the UE receives the sensing signal from the RAN network element based on the sensing resource and performs sensing, to obtain the sensing data.

In this embodiment, it is avoided that the UE requests the sensing data from a 5GC, so that the UE can perform sensing in collaboration with the RAN network element based on a sensing service requirement of the UE, to obtain the sensing data. In this implementation, the UE can quickly and efficiently perform sensing and obtain the sensing data.

The foregoing describes the embodiments of this application in detail, and the following provides some examples of a UE sensing method according to this application.

Figure 11A:
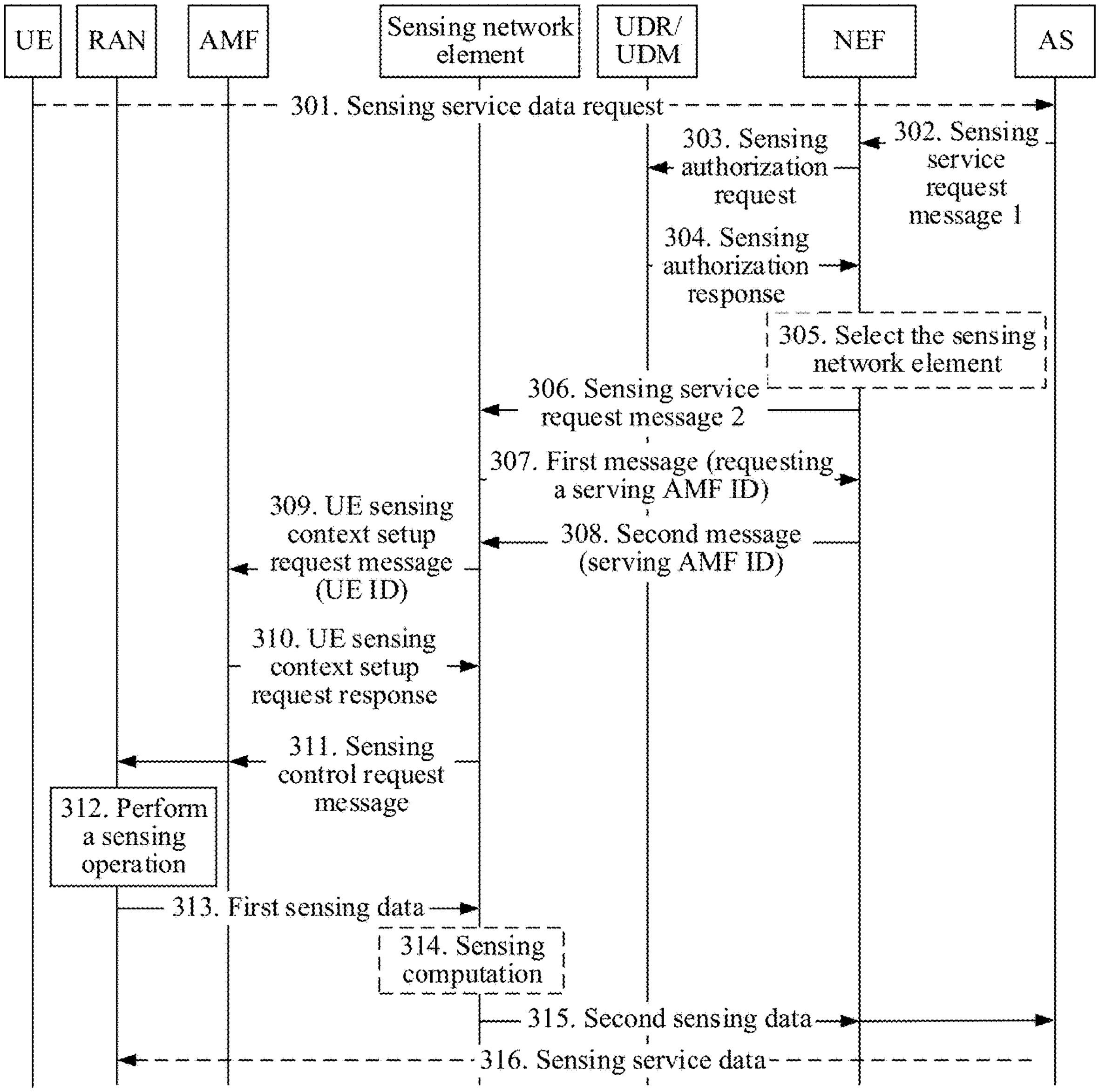
FIG. 11(*a*) is a schematic flowchart of a UE sensing method according to this application.
Figure 11B:
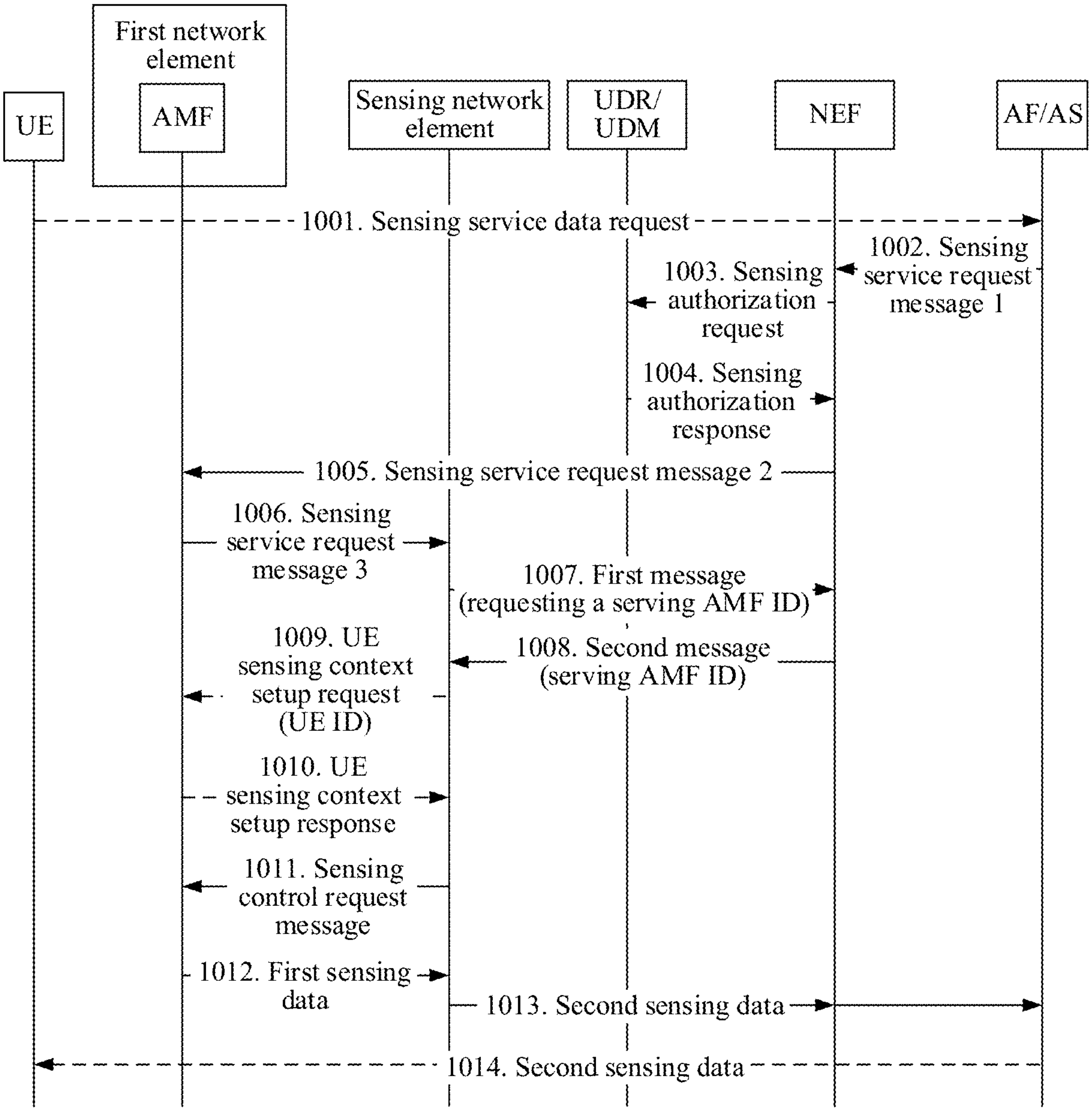

FIG. 11(*a*) is a schematic flowchart of a UE sensing method according to this application.

301. Optionally, the UE sends a sensing service data request message to an AF or an AS by using an application layer message when the UE has a sensing requirement.

302. The AF or the AS sends a sensing service request message 1 to an NEF based on the sensing requirement from the UE or a sensing requirement of the AF or the AS. The sensing service request message 1 carries information about the UE.

For example, the information about the UE may be a UE ID. Specifically, the UE ID herein may be an external identifier or may be an internal identifier.

Optionally, the sensing service request message 1 further includes information such as a service type, a sensing requirement, and a QoS requirement that are of the sensing service.

Optionally, the service requirement may include one or more of the following:

a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

303. The NEF sends a sensing authorization request message to a UDM or a UDR based on the sensing service request message 1.

The sensing authorization request message is used to request to obtain service authorization information of the UE. The sensing authorization request message 1 includes the information about the UE. Optionally, the service type and the service requirement are further included. Optionally, the NEF converts the external identifier into the internal identifier if the UE ID is the external identifier.

304. The UDM or the UDR returns a sensing authorization response message to the NEF based on the service authorization information of the UE. The sensing authorization response message indicates that the sensing service of the UE is authorized.

Optionally, the sensing service authorization response message includes service authorization indication information, and the service authorization indication information indicates that the sensing service of the UE is authorized.

Optionally, the UDM or the UDR further converts the external identifier of the UE into the internal identifier.

It should be understood that, the NEF network element may determine, through step 303 and step 304, that the sensing service of the UE is authorized.

305. Optionally, the NEF selects a sensing network element.

For example, the NEF network element selects, based on the sensing service request message 1, a sensing network element that supports a first sensing service.

That the sensing network element supports the first sensing service indicates that the sensing network element supports a service type, a service requirement, a QoS requirement, and the like that are of the first sensing service.

306. The NEF sends a sensing service request message 2 to the sensing network element.

The sensing service request message 2 includes the identifier of the UE, and may be specifically an internal identifier of the UE. Optionally, the sensing service request message 2 may further include one or more of a service type, a service requirement, and a QoS requirement.

Optionally, the service requirement may include one or more of the following:

a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

307. The sensing network element sends a first message to the UDM, where the first message is used to request a serving AMF of the UE. The first message includes the internal identifier of the UE.

308. The UDM returns a second message to the sensing network element, where the second message includes an identifier that is of the serving AMF of the UE and that is denoted as a serving AMF ID below.

Optionally, the sensing network element may establish a sensing signaling connection on an Nx interface between the sensing network element and the AMF, where the sensing signaling connection is used to interact, between the sensing network element and the AMF network element, signaling of the sensing service of the UE, as shown in step 309 and step 310.

309. The sensing network element sends a UE sensing context setup request message to the AMF, where the UE sensing context setup request message carries the UE ID.

310. The AMF returns a UE sensing context setup response message to the sensing network element.

Optionally, the AMF pages the UE if the UE is in an idle mode, so that the UE enters a connected mode. In this case, an N2 signaling connection is established between a RAN and the AMF.

In the embodiments of this application, the Nx interface is an interface between the sensing network element and the AMF or may be defined as a first interface. It may be understood that a specific name of the first interface may not be limited, and another name may be used in a 5G system or a future communication system. This is not limited.

Optionally, the sensing network element may invoke an existing message transmission service of the AMF to interact signaling with the RAN. For example, the signaling is N1N2MessageTransfer, N2InfoNotify, NonUeN2MessageTransfer, NonUeN2InfoNotify, or the like. That is, in this case, an existing message transmission service of the AMF is used to interact sensing signaling between the sensing network element and the AMF. In this case, step 309 and step 310 are optional steps.

311. The sensing network element sends a sensing control request message to the RAN.

Optionally, the sensing network element may directly send a sensing control request message 1 to the RAN.

Alternatively, the sensing network element sends the sensing control request message 1 to the AMF by using sensing signaling on the Nx interface, and then the AMF sends the sensing control request message 1 to the RAN by using signaling on the N2 interface.

The sensing control request message 1 carries a sensing control parameter.

Optionally, if the UE is in the idle mode, the AMF pages the UE after receiving the sensing control request message from the sensing network element by using the sensing signaling on the Nx interface, so that the UE enters a connected mode. In this case, an N2 signaling connection is established between the RAN and the AMF.

For example, the sensing control parameter may include one or more of the following:

a sensing distance, a sensing angle, a sensing range, a sensing speed range, a sensing distance resolution, a sensing speed resolution, an angle measurement accuracy of sensing (or sensing angle resolution), a sensing duration, and the like.

Optionally, the sensing control parameter is determined by the sensing network element based on a service type, a sensing requirement, a QoS requirement, and the like that are of the sensing service. Alternatively, the sensing control parameter is obtained by the sensing network element from the sensing service request message 1.

312. The RAN performs a sensing operation based on the sensing control request message 1, to obtain first sensing data of the first sensing service.

313. The RAN sends the first sensing data to the sensing network element. Optionally, step 314 is included.

314. The sensing network element performs sensing computation on the first sensing data, to obtain second sensing data.

315. The sensing network element returns the second sensing data to the AF or the AS.

Optionally, the sensing network element does not process the first sensing data from the RAN, that is, the second sensing data is the first sensing data.

Optionally, step 316 may be further included.

316. The AF or the AS returns the second sensing data to the UE.

FIG. 11(*b*) is a schematic flowchart of a UE sensing method according to this application.

1001. Optionally, a UE sends a sensing service data request message to an AF or an AS by using an application layer message when the UE has a sensing requirement.

1002. The AF or the AS sends a sensing service request message 1 to an NEF based on the sensing requirement from the UE or a sensing requirement of the AF or the AS.

1003. The NEF sends a sensing authorization request message to a UDM/UDR based on the sensing service request message 1.

1004. The UDM or the UDR returns a sensing authorization response message to the NEF based on service authorization information of the UE. The sensing authorization response message indicates that the sensing service of the UE is authorized.

That is, the sensing authorization response message indicates that the sensing service of the UE is authorized.

Optionally, the sensing service authorization response message includes service authorization indication information, and the service authorization indication information indicates that the sensing service of the UE is authorized.

For step 1001 to step 1004, refer to step 301 to step 304. To avoid repetition, a brief description is provided herein.

1005. The NEF sends a sensing service request message 2 to an AMF.

The sensing service request message 2 includes an identifier of the UE, and may be specifically an internal identifier of the UE. Optionally, the sensing service request message 2 may further include one or more of a service type, a service requirement, and a QoS requirement.

Optionally, the service requirement may include one or more of the following:

a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

1006. The AMF network element sends a sensing service request message 3 to a sensing network element.

The sensing service request message 3 includes the identifier of the UE. Optionally, the sensing service request message 3 may further include one or more of a service type, a service requirement, and a QoS requirement.

Optionally, the service requirement may include one or more of the following:

a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

1007. The sensing network element sends a first message to the UDM, where the first message is used to request a serving AMF of the UE. The first message includes the identifier of the UE.

1008. The UDM returns a second message to the sensing network element, where the second message includes an identifier that is of the serving AMF of the UE and that is denoted as a serving AMF ID below.

Optionally, the sensing network element may establish a sensing signaling connection on an Nx interface between the sensing network element and the AMF, where the sensing signaling connection is used to interact, between the sensing network element and the AMF network element, signaling of the sensing service of the UE, as shown in step 1109 and step 1110.

1009. The sensing network element sends a UE sensing context setup request message to the AMF, where the UE sensing context setup request message carries a UE ID.

1010. The AMF returns a UE sensing context setup response message to the sensing network element.

It should be understood that step 1009 and step 1010 are optional steps.

That is, an existing message transmission service may be used to interact sensing signaling between the sensing network element and the AMF, and no dedicated sensing signaling connection is established.

1011. The sensing network element sends a sensing control request message to a first network element (for example, a RAN network element or the AMF network element).

The sensing control request message carries a sensing control parameter.

For example, the sensing control parameter may include one or more of the following:

a sensing distance, a sensing angle, a sensing range, a sensing speed range, a sensing distance resolution, a sensing speed resolution, an angle measurement accuracy of sensing (or sensing angle resolution), a sensing duration, and the like.

Optionally, the sensing control parameter is determined by the sensing network element based on a service type, a sensing requirement, a QoS requirement, and the like that are of the sensing service. Alternatively, the sensing control parameter is obtained by the sensing network element from the sensing service request message.

1012. The sensing network element receives first sensing data of a first sensing service from the first network element.

Optionally, the first network element may be the AMF network element, an SMF network element, or the RAN network element.

1013. The sensing network element returns second sensing data to the AF or the AS.

Optionally, the second sensing data is obtained based on the first sensing data or the second sensing data is obtained by using the first sensing data.

Optionally, step 1014 may be further included.

1014. The AF or the AS returns the second sensing data to the UE.

For other descriptions of FIG. 11(*b*), refer to descriptions of corresponding steps in FIG. 11(*a*). Details are not described herein again.

Figure 12A:
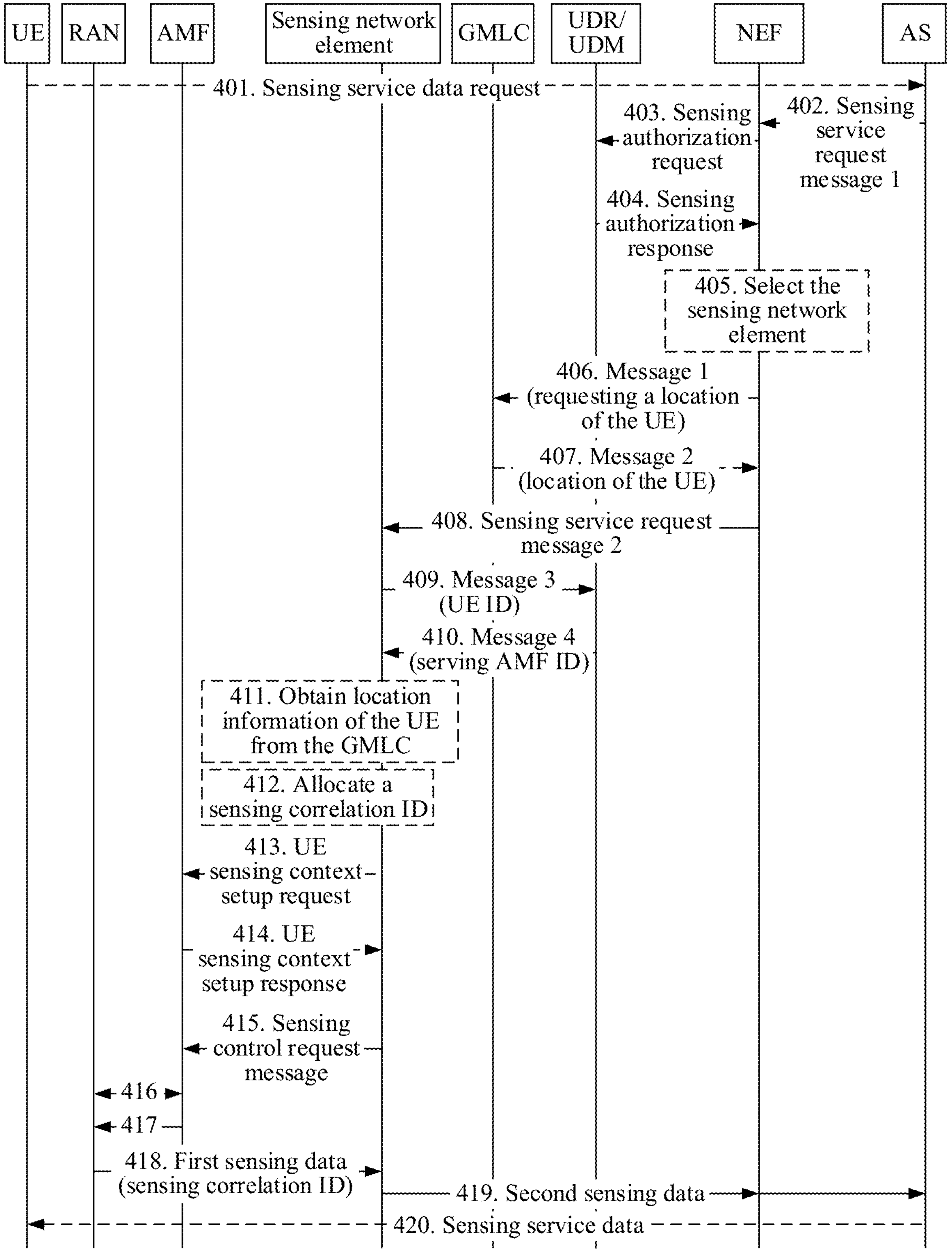
FIG. 12(*a*) is a schematic flowchart of a UE sensing method according to this application.
Figure 12B:
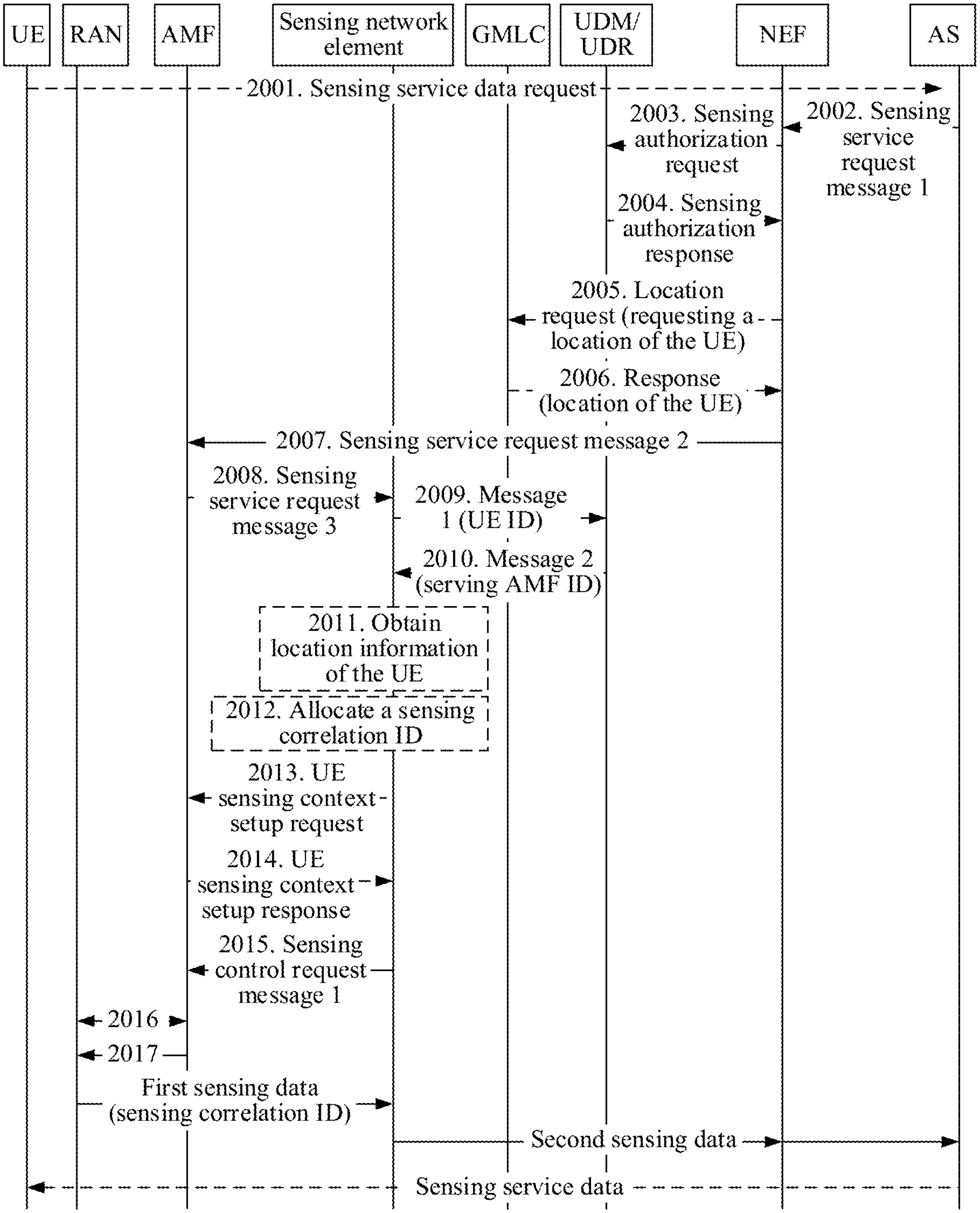

FIG. 12(*a*) is a schematic flowchart of another UE sensing method according to this application.

401. Optionally, a UE sends a sensing service data request to an AF or an AS by using an application layer message when the UE has a sensing requirement.

402. The AF or the AS sends a sensing service request message 1 to an NEF based on the sensing requirement from the UE or a sensing requirement of the AF or the AS.

The sensing service request message 1 includes a UE ID. Optionally, one or more of a service type, a service requirement, and a QoS requirement are further included.

403. The NEF sends a sensing authorization request message to a UDM or a UDR based on the sensing service request message 1.

Optionally, the sensing authorization request message includes the UE ID. Optionally, information such as the service type, the service requirement, and the QoS requirement is further included.

404. The UDM or the UDR returns a sensing authorization response message to the NEF based on service authorization information of the UE.

The sensing authorization response message indicates that a sensing service of the UE is authorized.

Optionally, the sensing service authorization response message includes service authorization indication information, and the service authorization indication information indicates that the sensing service of the UE is authorized.

Optionally, if the UE ID included in the sensing authorization request message is an external identifier of the UE, the UDM or the UDR further converts the external identifier of the UE into an internal identifier.

It should be understood that, step 403 and step 404 are a process in which the NEF performs, by using the UDM/UDR network element, an authorization check on the sensing service requested by the AF/AS. In step 404, the NEF determines, based on the authorization response message or the service authorization indication information, that the sensing service of the UE is authorized.

405. Optionally, the NEF selects a sensing network element.

For step 401 to step 405, refer to detailed descriptions of step 301 to step 305 in FIG. 11. To avoid repetition, these steps are briefly described.

Optionally, the NEF obtains location information of the UE, that is, step 406 and step 407 are optional steps.

406. The NEF requests the location information of the UE from a GMLC.

407. The GMLC returns the location information of the UE to the NEF.

Specifically, the NEF sends a message 1 to the GMLC, where the message 1 includes the UE ID. The GMLC initiates positioning of the UE after receiving the message 1 for requesting the location of the UE from the NEF, to obtain a location of the UE. The GMLC returns a message 2 to the NEF, where the message 2 includes the location information of the UE.

408. The NEF sends a sensing service request message 2 to the sensing network element, to request to sense the UE.

Optionally, the sensing service request message 2 carries the location information of the UE. Optionally, the UE ID, the service type, the service requirement, the QoS requirement, and the like may be further carried.

It can be learned that, in step 406 to step 408, the NEF converts sensing of the UE ID into sensing of a location point of the UE.

409. The sensing network element sends a message 3 to the UDM, where the message 3 is used to request a serving AMF of the UE.

The message 3 carries the UE ID (the internal identifier).

410. The UDM returns a message 4 to the sensing network element, where the message 4 carries an ID of the serving AMF of the UE.

Optionally, in another alternative solution of step 405 to step 407, after receiving the sensing authorization response message, the NEF directly sends a sensing service request message 2 to the sensing network element, where the sensing service request message 2 includes the identifier of the UE but does not include the location information of the UE. That is, step 406 and step 407 are not performed in the foregoing procedure. After receiving the sensing service request message 2, the sensing network element requests the location information of the UE from the GMLC, as shown in step 411. That is, step 411 is performed if step 406 and step 407 are not performed.

411. The sensing network element obtains the location information of the UE from the GMLC, the AMF, or an LMF.

Specifically, the sensing network element sends a location request message to the GMLC, the AMF, or the LMF, where the UE location request message includes the UE ID. The GMLC, AMF, or LMF initiates positioning of the UE based on the location request message, to obtain the location of the UE, and provides the location for the sensing network element.

412. Optionally, the sensing network element allocates a sensing correlation ID.

The sensing correlation ID is used to identify sensing data of the UE. Further, the sensing network element may send the sensing correlation ID to a RAN by using per-node signaling on an Nx interface and per-node signaling on an N2 interface.

Subsequently, the RAN uses the sensing correlation ID when reporting the sensing data of the UE, to associate the sensing data with the UE.

Optionally, if there is no signaling connection used for sensing on an Nx interface between the sensing network element and the AMF, the sensing network element establishes a sensing signaling connection on the Nx interface between the sensing network element and the AMF, as described in step 412 and step 413 below.

413. The sensing network element sends a sensing context setup request message to the AMF.

414. The AMF returns a sensing context setup response message to the sensing network element.

Optionally, the sensing signaling connection on the Nx interface may be a per-UE signaling connection or may be a per-node signaling connection.

The sensing network element controls the RAN to sense the UE by using per-node signaling on the Nx interface and per-node signaling on the N2 interface.

In addition, in subsequent step 415, if the sensing network element does not send a sensing control request message 1 by using per-UE signaling, that is, the sensing control request message 1 is sent to the RAN by using per-node signaling on the Nx interface and per-node signaling on the N2 interface, the per-node signaling on the Nx interface and the per-node signaling on the N2 interface carry the location information of the UE and the sensing correlation ID.

415. The sensing network element sends the sensing control request message 1 to the AMF.

Optionally, the sensing network element may directly send the sensing control request message 1 to the RAN.

Alternatively, the sensing network element sends the sensing control request message 1 to the AMF by using sensing signaling on the Nx interface, and then the AMF sends the sensing control request message 1 to the RAN by using signaling on the N2 interface. The sensing control request message 1 carries a sensing control parameter.

Optionally, the sensing network element further sends, to the AMF, information about a RAN that is responsible for sensing the UE. That is, the sensing network element indicates the information about a RAN to the AMF, so that the AMF determines a corresponding RAN.

For example, the information about the RAN may be a RAN ID or an E-UTRAN cell global identifier (ECGI). E-UTRAN stands for evolved universal terrestrial radio access network.

Optionally, the sensing network element further sends, to the AMF, location information of a UE that needs to be sensed, so that the AMF determines a corresponding RAN based on the location information of the UE.

The AMF determines the corresponding RAN based on the information that is about a RAN and that is indicated by the sensing network element or the location information of the UE.

416. Optionally, if the AMF finds that there is no signaling connection used for sensing on an N2 interface between the AMF and the RAN, the AMF establishes a sensing signaling connection on the N2 interface.

Optionally, the sensing signaling connection on the N2 interface may be a per-node N2 signaling connection or a per-UE N2 signaling connection. Optionally, in step 417, if the AMF sends the sensing control request message 1 by using per-UE signaling and the UE is in an idle mode, after receiving the sensing control request message from the sensing network element by using the sensing signaling on the Nx interface, the AMF pages the UE, so that the UE enters a connected mode. In this case, the per-UE N2 signaling connection is established between the RAN and the AMF.

417. The AMF sends the sensing control request message 1 to the RAN.

The sensing control request message 1 includes the location information of the UE. Optionally, information such as the UE ID, the service type, the service requirement, and the QoS requirement may be further included.

The RAN senses the UE based on the sensing control request message 1, to obtain first sensing data. Alternatively, the RAN senses, based on the sensing control request message 1, a location indicated by the location information of the UE, to obtain first sensing data. Therefore, in this embodiment, sensing of the UE ID is converted into sensing of a location point of the UE, so that privacy security of the UE can be protected.

418. The RAN sends the first sensing data to the sensing network element, where optionally, the sensing correlation ID is further carried, so that the sensing network element identifies that the first sensing data is the sensing data of the UE.

419. The sensing network element returns second sensing data to the AF or the AS.

Optionally, the sensing network element does not process the first sensing data from the RAN, that is, the second sensing data is the first sensing data.

Optionally, step 420 may be further included.

420. The AF or the AS returns sensing application data to the UE.

FIG. 12(*b*) is a schematic flowchart of a UE sensing method according to this application.

2001. Optionally, UE sends a sensing service data request to an AF or an AS by using an application layer message when the UE has a sensing requirement.

2002. The AF or the AS sends a sensing service request message 1 to an NEF based on the sensing requirement from the UE or a sensing requirement of the AF or the AS.

2003. The NEF sends a sensing authorization request message to a UDM or a UDR based on the sensing service request message 1.

2004. The UDM or the UDR returns a sensing authorization response message to the NEF based on service authorization information of the UE.

The sensing authorization response message indicates that a sensing service of the UE is authorized.

Optionally, the sensing service authorization response message includes service authorization indication information, and the service authorization indication information indicates that the sensing service of the UE is authorized.

It should be understood that, the NEF network element determines, through step 2001 to step 2004, that the sensing service of the UE is authorized.

Optionally, the NEF obtains location information of the UE.

2005. The NEF requests the location information of the UE from a GMLC.

2006. The GMLC returns the location information of the UE to the NEF.

Specifically, the NEF sends a location request message to the GMLC, where the location request message includes a UE ID. The GMLC initiates positioning of the UE based on the location request message from the NEF, to obtain a location of the UE. The GMLC returns a response message of the location request message to the NEF, where the response message includes the location information of the UE.

2007. The NEF sends a sensing service request message 2 to an AMF, to request to sense the UE.

Optionally, the sensing service request message 2 carries the location information of the UE, the UE ID, a service type, a service requirement, a QoS requirement, and the like.

2008. The AMF sends a sensing service request message 3 to a sensing network element, to request to sense the UE.

Optionally, the sensing service request message 3 carries the location information of the UE. Optionally, the UE ID, the service type, the service requirement, the QoS requirement, and the like may be further carried.

2009. The sensing network element sends a message 1 to a UDM, where the message 1 is used to request a serving AMF of the UE.

The message 1 carries the UE ID.

2010. The UDM/UDR returns a message 2 to the sensing network element, where the message 2 carries an ID of the serving AMF of the UE.

Optionally, if the sensing service request message 3 does not include the location information of the UE, the sensing network element may obtain the location information of the UE by itself, as shown in step 2011 below.

2011. Optionally, the sensing network element obtains the location information of the UE from the GMLC, the AMF, or an LMF.

Specifically, the sensing network element sends a location request message to the GMLC, the AMF, or the LMF, where the UE location request message includes the UE ID. The GMLC, AMF, or LMF initiates positioning of the UE based on the location request message, to obtain the location of the UE, and provides the location for the sensing network element.

2012. Optionally, the sensing network element allocates a sensing correlation ID.

Optionally, if there is no signaling connection used for sensing on an Nx interface between the sensing network element and the AMF, the sensing network element establishes a sensing signaling connection on the Nx interface between the sensing network element and the AMF, as described in step 2013 and step 2014 below.

2013. The sensing network element sends a sensing context setup request message to the AMF.

2014. The AMF returns a sensing context setup response message to the sensing network element.

The sensing signaling connection on the Nx interface may be a per-UE signaling connection or may be a per-node signaling connection. The sensing network element controls the RAN to sense the UE by using per-node signaling on the Nx interface and per-node signaling on the N2 interface.

In subsequent step 2015, if the sensing network element does not send a sensing control request message 1 by using per-UE signaling, that is, the sensing control request message 1 is sent to the RAN by using per-node signaling on the Nx interface and per-node signaling on the N2 interface, the per-node signaling on the Nx interface and the per-node signaling on the N2 interface carry the location information of the UE and the sensing correlation ID.

2015. The sensing network element sends the sensing control request message 1 to the AMF.

Optionally, the sensing network element may directly send the sensing control request message 1 to the RAN.

Alternatively, the sensing network element sends the sensing control request message 1 to the AMF by using sensing signaling on the Nx interface, and then the AMF sends the sensing control request message 1 to the RAN by using signaling on the N2 interface. The sensing control request message 1 carries a sensing control parameter.

Optionally, the sensing network element further sends, to the AMF, information about a RAN that is responsible for sensing the UE. That is, the sensing network element indicates the information about a RAN to the AMF, so that the AMF determines a corresponding RAN.

Optionally, the sensing network element further sends, to the AMF, location information of UE that needs to be sensed, so that the AMF determines a corresponding RAN based on the location information of the UE.

The AMF determines the corresponding RAN based on the information that is about a RAN and that is indicated by the sensing network element or the location information of the UE.

2016. Optionally, if the AMF finds that there is no signaling connection used for sensing on an N2 interface between the AMF and the RAN, the AMF establishes a sensing signaling connection on the N2 interface.

Optionally, the sensing signaling connection on the N2 interface may be a per-node N2 signaling connection or a per-UE N2 signaling connection. Optionally, if the sensing control request message 1 is sent by using per-UE signaling and the UE is in an idle mode, after receiving the sensing control request message from the sensing network element by using the sensing signaling on the Nx interface, the AMF pages the UE, so that the UE enters a connected mode. In this case, the per-UE N2 signaling connection is established between the RAN and the AMF.

2017. The AMF sends the sensing control request message 1 to the RAN.

The sensing control request message 1 includes the location information of the UE. Optionally, information such as the UE ID, the service type, the service requirement, and the QoS requirement may be further included.

The RAN senses the UE based on the sensing control request message 1, to obtain first sensing data. Alternatively, the RAN senses, based on the sensing control request message 1, a location indicated by the location information of the UE, to obtain first sensing data.

Subsequently, the RAN sends the first sensing data to the sensing network element. Optionally, the RAN further sends the sensing correlation ID to the sensing network element, so that the sensing network element identifies that the first sensing data is sensing data of the UE.

The sensing network element returns second sensing data to the AF or the AS. Further, optionally, the AF or the AS returns the second sensing data (that is, sensing service data) to the UE.

Figure 13A:
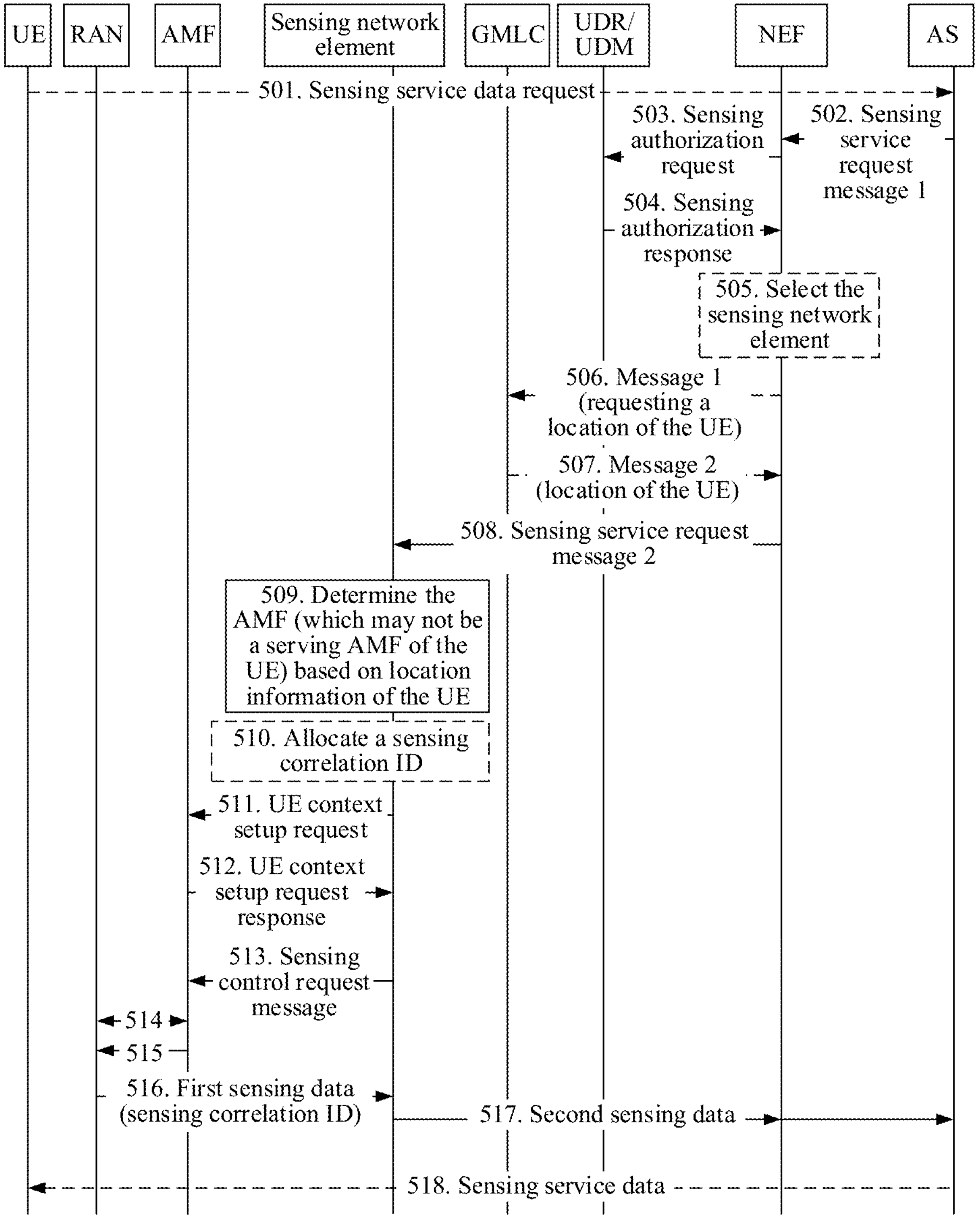
FIG. 13(*a*) is a schematic flowchart of a UE sensing method according to this application.
Figure 13B:
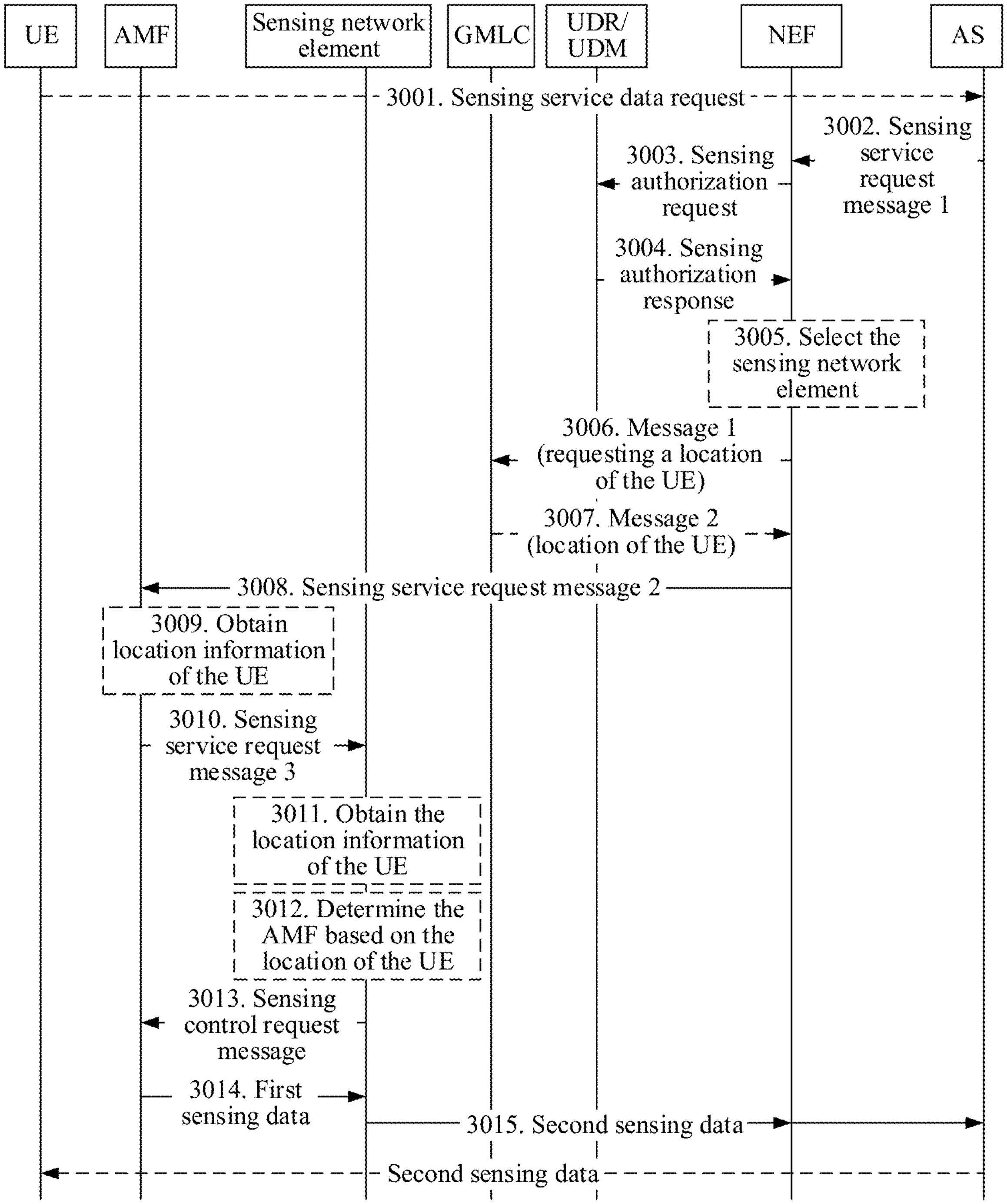

FIG. 13(*a*) is a schematic flowchart of a UE sensing method according to this application.

For 501 to 507, refer to step 401 to step 407 in FIG. 12(*a*). To avoid repetition, details are not described herein again.

508. The NEF sends a sensing service request message 2 to the sensing network element, to request to sense the UE.

Optionally, the sensing service request message 2 may include one or more of the location information of the UE, the UE ID, the service type, the service requirement, and the QoS requirement.

Optionally, the service requirement may include one or more of the following:

a sensing service type, a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

509. The sensing network element determines an AMF based on the location information of the UE.

It should be noted that, in step 509, the AMF determined by the sensing network element based on the location information of the UE does not need to be a serving AMF of the UE, that is, the AMF determined by the sensing network element may be the serving AMF of the UE or may not be the serving AMF of the UE.

Optionally, the sensing network element determines the AMF based on the location information of the UE or the sensing network element may determine the AMF by using an NRF.

Optionally, the sensing network element may obtain the location information of the UE by itself if the sensing service request message 2 does not include the location information of the UE. For example, the sensing network element obtains the location information of the UE from a GMLC or an LMF.

For subsequent step 510 to step 518, refer to step 412 to step 420 in FIG. 12(*a*), and details are not described herein again.

FIG. 13(*b*) is a schematic flowchart of another UE sensing method according to this application.

For 3001 to 3007, refer to step 401 to step 407 in FIG. 12(*a*), and details are not described herein again.

3008. The NEF sends a sensing service request message 2 to an AMF, to request to sense the UE.

3009. Optionally, the AMF obtains the location information of the UE.

For example, for obtaining, by the AMF, the location information of the UE from the GMLC or an LMF, refer to detailed descriptions in the foregoing other embodiments. Details are not described herein again.

3010. The AMF sends a sensing service request message 3 to the sensing network element, to request to sense the UE.

Optionally, the sensing service request message 3 includes one or more of the location information of the UE, the UE ID, the service type, the service requirement, and the QoS requirement.

Optionally, the service requirement may include one or more of the following:

a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

The sensing network element obtains the location information of the UE by itself if the sensing service request message 3 does not include the location information of the UE.

3011. Optionally, the sensing network element obtains the location information of the UE.

For example, the sensing network element obtains the location information of the UE from the GMLC, the LMF, or the AMF.

3012. The sensing network element determines the AMF based on the location information of the UE.

In step 3012, the AMF determined by the sensing network element based on the location information of the UE may be a serving AMF of the UE or may not be the serving AMF of the UE.

3013. The sensing network element sends a sensing control request message to the AMF.

3014. The sensing network element receives first sensing data of the UE from the AMF. Optionally, a sensing association identifier may further be included.

It should be understood that, the AMF further sends the sensing control request message to a RAN after receiving the sensing control request message from the sensing network element, and the RAN senses the UE based on the sensing control request message and obtains the first sensing data. The RAN reports the first sensing data to the AMF. Therefore, the first sensing data of the UE is obtained by the RAN network element by sensing the UE and is reported to the AMF by the RAN network element. For example, refer to related descriptions of step 311 to step 313 in FIG. 11(*a*).

3015. The sensing network element provides second sensing data for the AF/AS.

Further, optionally, the AF/AS provides the second sensing data for the UE.

In the embodiment in FIG. 13, a description is provided by using an example in which the NEF network element performs an authorization check on a first sensing service requested by the AF/AS. Optionally, the AMF network element may alternatively perform an authorization check on the first sensing service requested by the AF/AS, for example, in a procedure in FIG. 6(*c*). Details are not described again.

Figure 14:
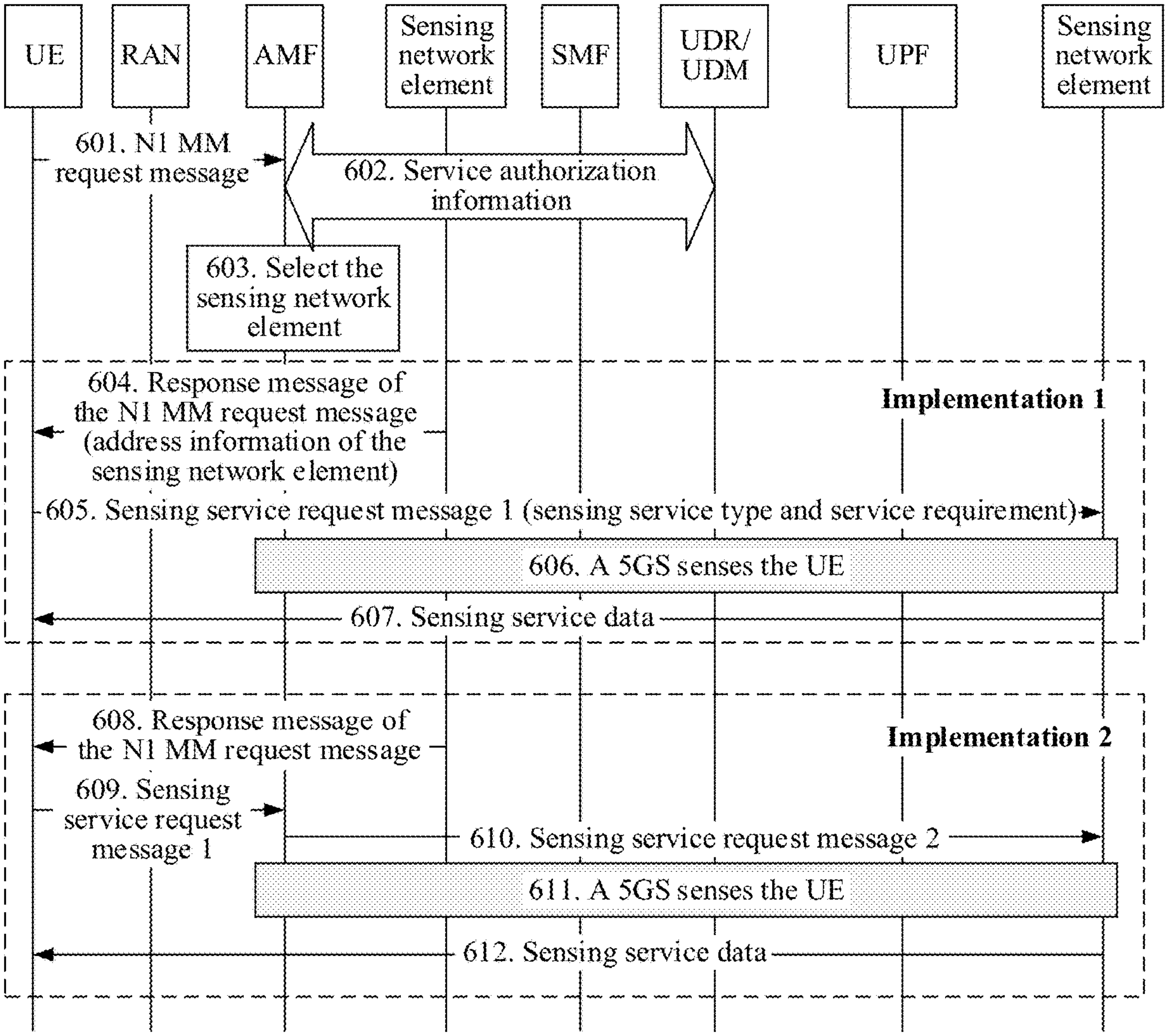
FIG. 14 is a schematic flowchart of a UE sensing method according to this application.

FIG. 14 is a schematic flowchart of a UE sensing method according to this application.

601. UE sends an N1 MM request message to an AMF.

The N1 MM request message includes sensing indication information. The sensing indication information indicates to request a sensing service.

Optionally, the N1 MM request message may further include a service type and/or a service requirement.

Optionally, the service requirement may include one or more of the following:

a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

For example, the N1 MM request message is a registration request message or a service request message.

602. Optionally, the AMF obtains service authorization information of the UE from subscription information of the UE, and determines, based on the service authorization information, that a sensing service of the UE is authorized.

Specifically, the AMF may locally obtain the service authorization information of the UE if the AMF stores the subscription information of the UE. The AMF may request the subscription information of the UE from a UDM/UDR if the AMF does not store the subscription information of the UE, to further obtain the service authorization information of the UE from the subscription information. The AMF determines, based on the service authorization information, that the sensing service of the UE is authorized.

For example, the service authorization information includes first sensing authorization indication information and/or a first sensing authorization parameter.

The first sensing authorization indication information indicates that the sensing service of the UE is authorized.

Optionally, the first sensing authorization parameter may include one or more of the following:

a sensing service type, a sensing distance, a sensing area, a sensing speed range, a sensing distance resolution, an angle measurement accuracy of sensing, a sensing speed resolution, a sensing quality of service QoS requirement, a sensing object identification accuracy, a sensing object identification false alarm rate, a sensing data accuracy, a sensing data update frequency, a sensing dimension, a sensing feedback manner, a sensing requester type, a sensing requester identifier, a sensing application type, and a sensing application identifier.

603. Optionally, the AMF selects an appropriate sensing network element for the UE.

For example, the AMF may select the appropriate sensing network element based on information carried in the N1 MM request message.

After step 603, there may be two implementations, for example, Implementation 1 and Implementation 2 below.

Optionally, this step may be performed between step 609 and step 610 for Implementation 2 described below.

Implementation 1

604. The AMF sends a response message of the N1 MM request message to the UE.

The response message of the N1 MM request message indicates that the sensing service of the UE is authorized.

In addition, the response message includes sensing accept indication information and address information of the sensing network element. The sensing accept indication information indicates that a request of the UE for the sensing service is accepted.

The UE may request the sensing service from the sensing network element through a user plane when the response message includes the address information of the sensing network element.

605. The UE establishes a signaling connection to the sensing network element based on the address information of the sensing network element, and sends a sensing service request message 1 to the sensing network element based on the signaling connection.

The sensing service request message 1 is used to request a first sensing service.

Optionally, the sensing service request message 1 includes one or more of a service type, a service requirement, and a QoS requirement.

606. A 5GS senses the UE based on the sensing service request message 1 of the UE, to obtain sensing service data of the first sensing service.

In step 605, the sensing network element receives the sensing service request message 1 from the UE. In step 606, the sensing network element selects the AMF network element (a RAN network element needs to be further determined) or the RAN network element and controls the RAN network element to perform sensing, to obtain the sensing data of the first sensing service. A sensing process in which the sensing network element selects the AMF network element or a RAN network element and controls the RAN network element to perform sensing may be implemented by using the foregoing embodiment, for example, step 25 to step 27 in FIG. 4(*a*), or by using another embodiment. This is not limited.

607. The sensing network element returns the sensing service data to the UE.

Implementation 2

608. The AMF sends a response message of the N1 MM request message to the UE.

The response message of the N1 MM request message indicates that the sensing service of the UE is authorized.

Optionally, the response message carries sensing accept indication information. The sensing accept indication information indicates that a request of the UE for the sensing service is accepted.

Different from that in Implementation 1, in this case, the UE may request the sensing service from the sensing network element through a control plane.

609. The UE sends a sensing service request message 1 to the AMF.

The sensing service request message 1 is used to request the first sensing service. For example, the sensing service request message 1 may be the N1 MM request message.

Optionally, the sensing service request message 1 includes one or more of a service type, a service requirement, and a QoS requirement.

610. The AMF sends a sensing service request message 2 to the sensing network element.

The sensing service request message 2 is used to request the first sensing service.

Optionally, the sensing service request message 2 includes the service type and the service requirement.

611. The 5GS senses the UE based on the sensing service request message 2, to obtain the sensing service data of the first sensing service.

In step 610, the sensing network element receives the sensing service request message 2 from the AMF. Subsequently, in step 611, the sensing network element selects the AMF network element (a RAN network element needs to be further determined) or the RAN network element and controls the RAN network element to perform sensing, to obtain the sensing data of the first sensing service. A sensing process in which the sensing network element selects the AMF network element or a RAN network element and controls the RAN network element to perform sensing may be implemented by using the foregoing embodiment, for example, step 25 to step 27 in FIG. 4(*a*), or by using another embodiment. This is not limited.

612. The sensing network element returns the sensing service data to the UE.

Figure 15:
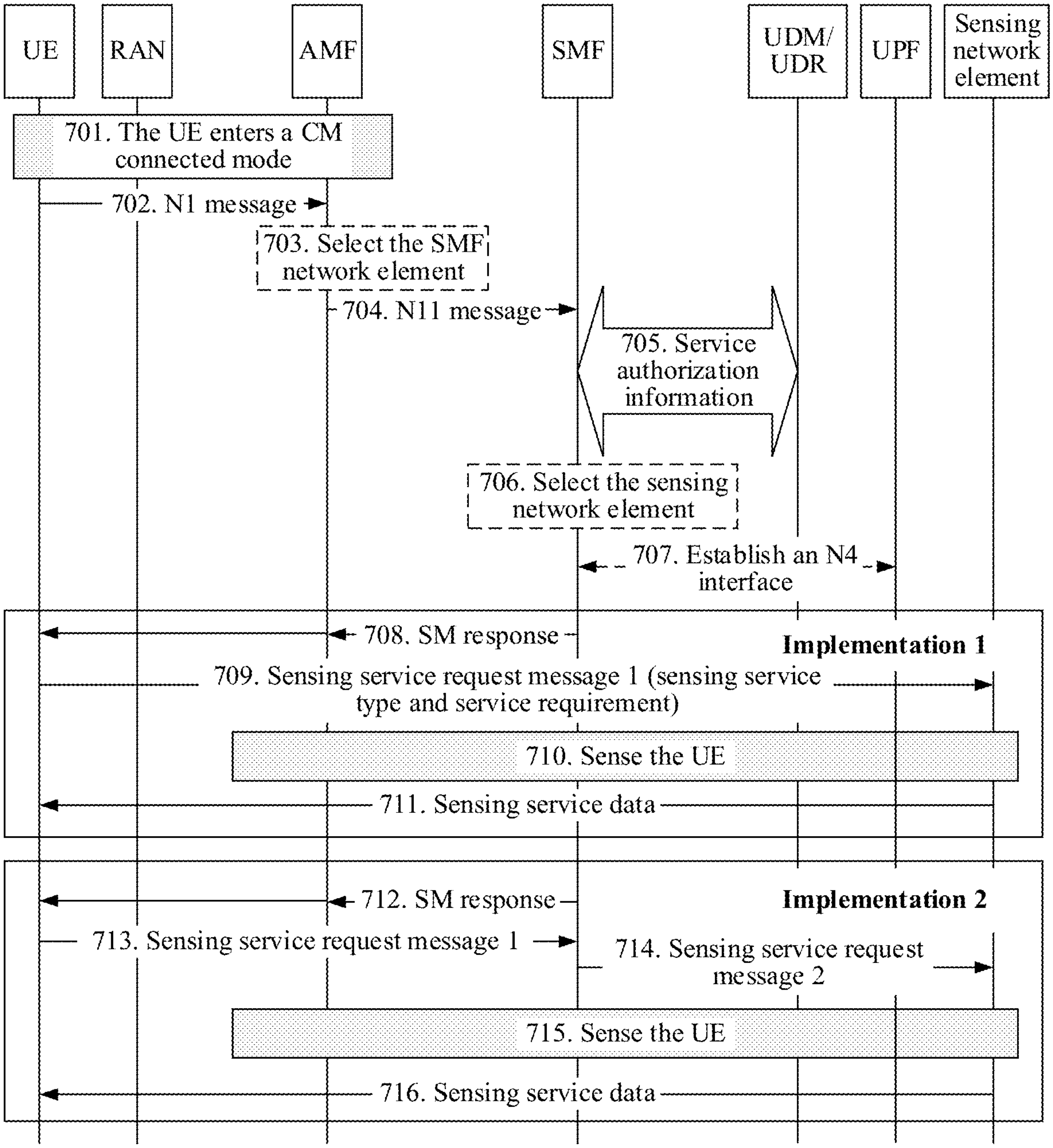
FIG. 15 is a schematic flowchart of a UE sensing method according to this application.

FIG. 15 is a schematic flowchart of a UE sensing method according to this application.

701. UE enters a connection management (CM) connected mode.

702. The UE sends an N1 message to an AMF.

Optionally, the N1 message may be a session management (SM) request message.

The UE adds the session management request message to the N1 message, where the session management request message is used to request a sensing service for the UE. Optionally, the UE includes a sensing indication in the session management request, to indicate that the session management request message is used to request a sensing service for the UE. Optionally, the session management request message may further include a sensing service type and a sensing requirement.

Optionally, the session management request message includes sensing indication information, and the sensing indication information indicates to request the sensing service. Optionally, the N1 message further includes a service type and/or a service requirement.

Optionally, the service requirement may include one or more of the following:

a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

703. Optionally, the AMF selects an appropriate SMF for the UE.

For example, the AMF selects the appropriate SMF based on information carried in the N1 message.

704. The AMF sends an N11 message to the SMF.

The N11 message includes the session management request message.

Optionally, the N11 message may be an SM request message.

705. Optionally, the SMF obtains service authorization information of the UE, and determines, based on the service authorization information, that the sensing service of the UE is authorized.

Specifically, the SMF obtains subscription information of the UE, and further obtains the service authorization information of the UE. The SMF determines, based on the service authorization information, that the sensing service of the UE is authorized.

The SMF requests the subscription information of the UE from a UDM/UDR if the SMF does not have the subscription information of the UE.

For example, the service authorization information may include first sensing authorization indication information and/or a first sensing authorization parameter. The first sensing authorization indication information indicates that the sensing service of the UE is authorized.

Optionally, the first sensing authorization parameter may include one or more of the following:

a sensing service type, a sensing distance, a sensing area, a sensing speed range, a sensing distance resolution, an angle measurement accuracy of sensing, a sensing speed resolution, a sensing quality of service QoS requirement, a sensing object identification accuracy, a sensing object identification false alarm rate, a sensing data accuracy, a sensing data update frequency, a sensing dimension, a sensing feedback manner, a sensing requester type, a sensing requester identifier, a sensing application type, and a sensing application identifier.

706. Optionally, the SMF selects an appropriate sensing network element for the UE.

Optionally, step 707 is included.

707. If the N11 message in step 704 is specifically a PDU session establishment request message, the SMF selects an appropriate user plane function UPF for the UE, and the SMF establishes an N4 connection between the SMF and the UPF.

Optionally, after step 707, the UE may request the sensing service from the sensing network element by using a user plane connection, or may request the sensing service from the sensing network element by using control plane signaling.

Implementation 1

708. The SMF sends a session management SM response message to the UE.

The session management response message indicates that the sensing service of the UE is authorized.

In addition, the session management response message includes sensing accept indication information and address information of the sensing network element, and the sensing accept indication information indicates that a request of the UE for the sensing service is accepted.

709. The UE establishes a signaling connection to the sensing network element based on the address information of the sensing network element, and sends a sensing service request message 1 to the sensing network element based on the signaling connection.

The sensing service request message 1 is used to request a first sensing service, and the sensing service request message 1 includes a service type and/or a service requirement.

710. A 5GS senses the UE based on the sensing service request message 1 of the UE, to obtain sensing service data of the first sensing service.

711. The sensing network element sends the sensing service data to the UE.

Implementation 2

712. The SMF sends a session management response message to the UE.

The session management response message indicates that the sensing service of the UE is authorized.

Optionally, the session management response message includes sensing accept indication information, indicating that a request of the UE for the sensing service is accepted.

Different from Implementation 1, in this case, the UE may request the sensing service from the sensing network element by using control plane signaling.

713. The UE sends the sensing service request message 1 to an SMF by using a session management message.

The sensing service request message 1 is used to request a first sensing service. Optionally, the sensing service request message 1 includes a service type and/or a service requirement.

714. The SMF sends a sensing service request message 2 to the sensing network element.

The sensing service request message 2 is used to request the first sensing service. Optionally, the sensing service request message 2 includes the service type and the service requirement.

715. A 5GS senses the UE based on the sensing service request message 2, to obtain sensing service data of the first sensing service.

716. The sensing network element sends the sensing service data to the UE.

Figure 16:
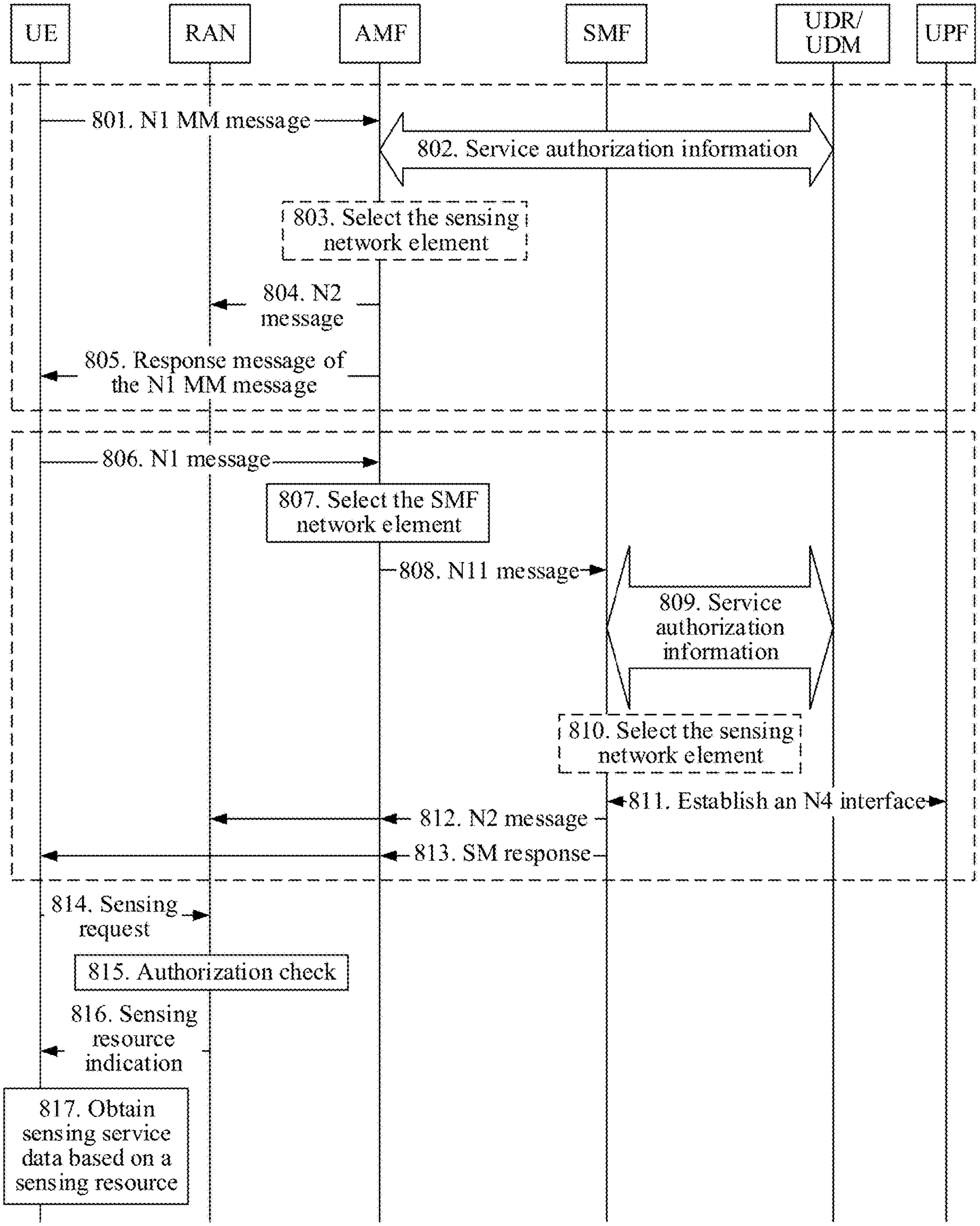
FIG. 16 is a schematic flowchart of a UE sensing method according to this application.

FIG. 16 is a schematic flowchart of a UE sensing method according to this application.

Optionally, in this embodiment, the UE may obtain, through step 801 to step 805, that the sensing service is authorized. Alternatively, the sensing service may be authorized by performing step 806 to step 813.

Implementation 1

801. UE sends an N1 MM request message to an AMF.

802. Optionally, the AMF obtains subscription information of the UE from a UDM/UDR, to further obtain service authorization information of the UE, and determines, based on the service authorization information, that the sensing service of the UE is authorized.

Optionally, the service authorization information includes first sensing authorization indication information and/or a first sensing authorization parameter.

The first sensing authorization indication information indicates that the sensing service of the UE is authorized. The first sensing authorization parameter is a sensing parameter that a network side authorizes the UE to use.

Optionally, the first sensing authorization parameter may include one or more of the following:

a sensing service type, a sensing distance, a sensing area, a sensing speed range, a sensing distance resolution, an angle measurement accuracy of sensing, a sensing speed resolution, a sensing quality of service QoS requirement, a sensing object identification accuracy, a sensing object identification false alarm rate, a sensing data accuracy, a sensing data update frequency, a sensing dimension, a sensing feedback manner, a sensing requester type, a sensing requester identifier, a sensing application type, and a sensing application identifier.

803. Optionally, the AMF selects an appropriate sensing network element for the UE.

Optionally, the AMF obtains service authorization information of the UE from the sensing network element. Optionally, the service authorization information includes first sensing authorization indication information and/or a first sensing authorization parameter.

The first sensing authorization indication information indicates that the sensing service of the UE is authorized. The first sensing authorization parameter is a sensing parameter that a network side authorizes the UE to use.

Optionally, the first sensing authorization parameter may include one or more of the following:

a sensing service type, a sensing distance, a sensing area, a sensing speed range, a sensing distance resolution, an angle measurement accuracy of sensing, a sensing speed resolution, a sensing quality of service QoS requirement, a sensing object identification accuracy, a sensing object identification false alarm rate, a sensing data accuracy, a sensing data update frequency, a sensing dimension, a sensing feedback manner, a sensing requester type, a sensing requester identifier, a sensing application type, and a sensing application identifier.

For other descriptions of step 801 to step 803, refer to step 601 to step 603 in the foregoing. To avoid repetition, details are not described herein again.

804. The AMF sends an N2 message to a RAN.

The N2 message includes second sensing authorization indication information and/or a second sensing authorization parameter.

The second sensing authorization indication information indicates that the sensing service of the UE is authorized. The second sensing authorization parameter is a sensing parameter that the network side authorizes the UE to use.

Optionally, the second sensing authorization parameter may include one or more of the following:

a sensing service type, a sensing distance, a sensing area, a sensing speed range, a sensing distance resolution, an angle measurement accuracy of sensing, a sensing speed resolution, a sensing quality of service QoS requirement, a sensing object identification accuracy, a sensing object identification false alarm rate, a sensing data accuracy, a sensing data update frequency, a sensing dimension, a sensing feedback manner, a sensing requester type, a sensing requester identifier, a sensing application type, and a sensing application identifier.

Optionally, the second sensing authorization indication information is the first sensing authorization indication information. The second sensing authorization parameter may be determined based on the first sensing authorization parameter.

In step 804, the AMF sends the second authorization indication information and/or the second sensing authorization parameter to the RAN by using the N2 message, so that the RAN subsequently performs an authorization check on a sensing request of the UE.

805. The AMF returns a response of the N1 MM request to the UE.

The response message of the N1 MM request message indicates that the sensing service of the UE is authorized.

Optionally, the response message includes sensing accept indication information. The sensing accept indication information indicates that a request of the UE for the sensing service is accepted.

It should be noted that a sequence of step 804 and step 805 is not limited. Alternatively, step 804 and step 805 are combined into one message, that is, the AMF sends the information and/or the parameter in step 804 and step 805 to the UE by using one message. This is not limited.

Implementation 2

806. The UE sends an N1 message to an AMF.

807. The AMF selects an appropriate SMF for the UE.

808. The AMF sends a session management request to the SMF by using an N11 message.

809. Optionally, the SMF obtains service authorization information of the UE, and determines, based on the service authorization information, that the sensing service of the UE is authorized.

Optionally, the service authorization information includes first sensing authorization indication information and/or a first sensing authorization parameter.

The first sensing authorization indication information indicates that the sensing service of the UE is authorized. The first sensing authorization parameter is a sensing parameter that a network side authorizes the UE to use.

Optionally, the first sensing authorization parameter may include one or more of the following:

a sensing service type, a sensing distance, a sensing area, a sensing speed range, a sensing distance resolution, an angle measurement accuracy of sensing, a sensing speed resolution, a sensing quality of service QoS requirement, a sensing object identification accuracy, a sensing object identification false alarm rate, a sensing data accuracy, a sensing data update frequency, a sensing dimension, a sensing feedback manner, a sensing requester type, a sensing requester identifier, a sensing application type, and a sensing application identifier.

810. Optionally, the SMF selects an appropriate sensing network element for the UE.

Optionally, the SMF obtains service authorization information of the UE from the sensing network element. Optionally, the service authorization information includes first sensing authorization indication information and/or a first sensing authorization parameter.

The first sensing authorization indication information indicates that the sensing service of the UE is authorized. The first sensing authorization parameter is a sensing parameter that a network side authorizes the UE to use.

Optionally, the first sensing authorization parameter may include one or more of the following:

a sensing service type, a sensing distance, a sensing area, a sensing speed range, a sensing distance resolution, an angle measurement accuracy of sensing, a sensing speed resolution, a sensing quality of service QoS requirement, a sensing object identification accuracy, a sensing object identification false alarm rate, a sensing data accuracy, a sensing data update frequency, a sensing dimension, a sensing feedback manner, a sensing requester type, a sensing requester identifier, a sensing application type, and a sensing application identifier.

Optionally, step 811 is included.

811. The SMF establishes an N4 connection between the SMF and a UPF.

For other descriptions of step 806 to step 811, refer to step 702 to step 707 in the foregoing. To avoid repetition, details are not described herein again.

812. The SMF sends an N2 message to a RAN.

The SM message may include second sensing authorization indication information and/or a second sensing authorization parameter.

The second sensing authorization indication information indicates that the sensing service of the UE is authorized.

The second sensing authorization parameter is a sensing parameter that is authorized to be used by the UE.

Optionally, the second sensing authorization parameter may include one or more of the following:

a sensing service type, a sensing distance, a sensing area, a sensing speed range, a sensing distance resolution, an angle measurement accuracy of sensing, a sensing speed resolution, a sensing quality of service QoS requirement, a sensing object identification accuracy, a sensing object identification false alarm rate, a sensing data accuracy, a sensing data update frequency, a sensing dimension, a sensing feedback manner, a sensing requester type, a sensing requester identifier, a sensing application type, and a sensing application identifier.

Optionally, the second sensing authorization indication information is the first sensing authorization indication information. The second sensing authorization parameter may be determined based on the first sensing authorization parameter.

In step 813, the SMF sends the second authorization indication information and/or the second sensing authorization parameter to the RAN by using an N2 session management message, so that the RAN subsequently performs an authorization check on a sensing request of the UE.

813. The SMF returns an SM response message to the UE.

The SM response message includes sensing accept indication information.

According to the procedure of step 801 to step 805 or the procedure of step 806 to step 813, the UE determines, based on the sensing accept indication information, that the sensing service of the UE is authorized, that is, the UE may request the sensing service. When the UE has a sensing requirement, the UE may directly request a sensing resource from the RAN, and obtain, based on the sensing resource, sensing service data of the requested sensing service. For details, refer to the following procedure.

814. The UE sends a sensing request message to the RAN when the UE has the sensing requirement.

The sensing request message is used to request the sensing resource or request the RAN to sense the UE.

In addition, optionally, the sensing request message includes a service type and/or a service requirement (that is, a sensing requirement).

Optionally, the sensing requirement may include one or more of the following:

a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, and a sensing feedback manner.

For example, the sensing request message may be a radio resource control (RRC) message.

815. The RAN performs authorization check on the UE.

Specifically, the RAN performs an authorization check on the service requirement in the sensing request message of the UE based on the second sensing authorization indication information and/or the second sensing authorization parameter that are/is received from the AMF in step 804, or based on the second sensing authorization indication information and/or the second sensing authorization parameter that are/is received from the SMF in step 812.

Step 816 is performed when the first sensing service of the UE being authorized is determined.

816. The RAN sends sensing resource indication information to the UE, where the sensing resource indication information indicates the sensing resource, for example, a time-frequency resource.

817. The UE obtains sensing data of the first sensing service based on the sensing resource.

In a possible implementation, the UE performs sensing based on the sensing resource. To be specific, the UE sends a sensing signal and receives an echo signal of the sensing signal to perform sensing, to obtain first sensing data of the first sensing service.

In another possible implementation, the UE receives a sensing signal from the RAN based on the sensing resource. To be specific, the RAN sends the sensing signal by using the sensing resource, and the UE receives the sensing signal to perform sensing, to obtain first sensing data of the first sensing service. Alternatively, that the UE receives the sensing signal to perform sensing may be that the UE receives an echo signal of the sensing signal to perform sensing.

In another possible implementation, the UE sends a sensing signal based on the sensing resource, and the RAN network element receives the sensing signal and performs sensing, to obtain first sensing data of the first sensing service. The RAN network element sends the first sensing data to the UE, and the UE receives the first sensing data from the RAN network element. Optionally, that the RAN network element receives the sensing signal and performs sensing may be that the RAN network element receives an echo signal of the sensing signal to perform sensing.

In addition, the echo signal may also be referred to as a reflected signal.

Figure 17:
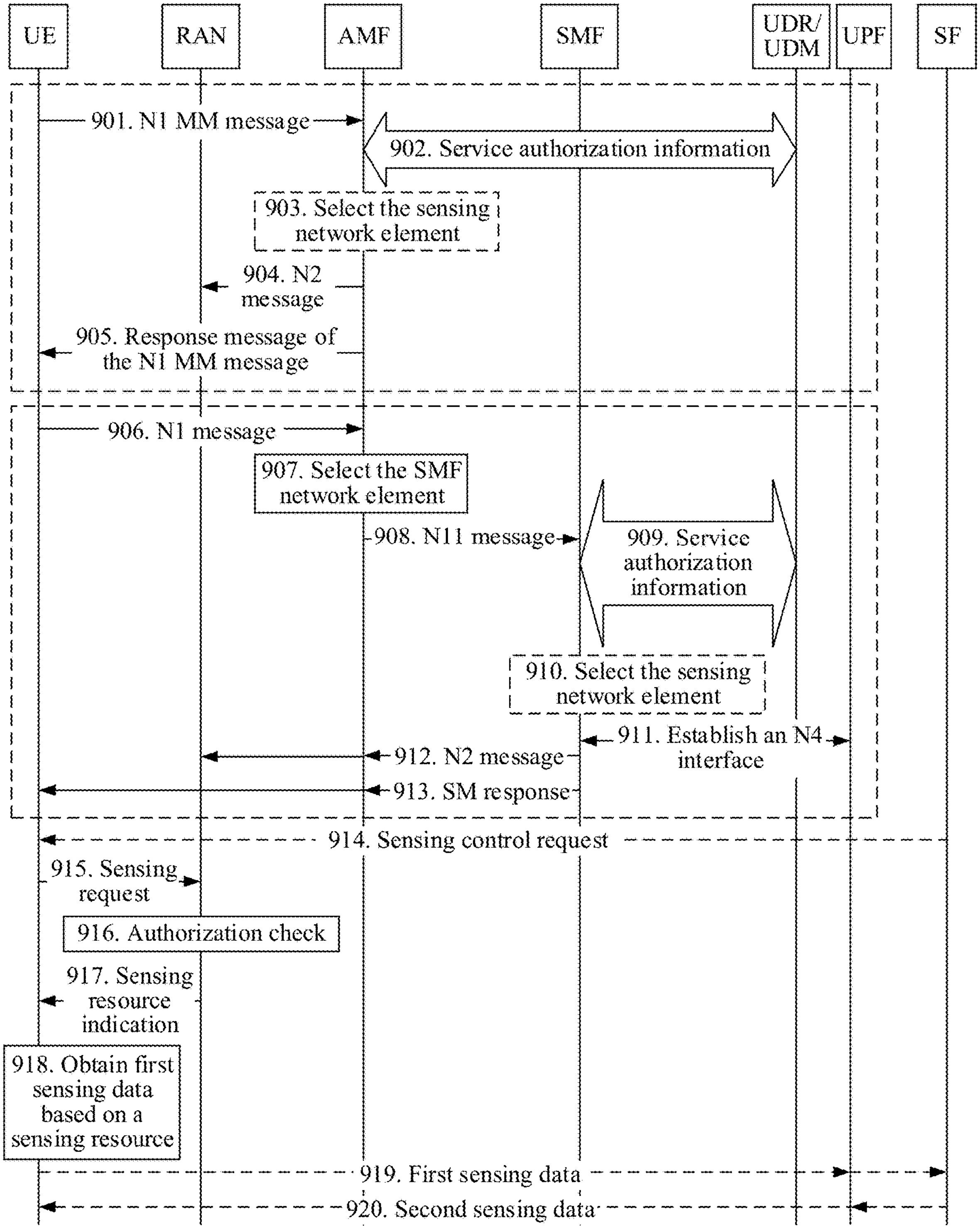
FIG. 17 is a schematic flowchart of a UE sensing method according to this application.

FIG. 17 is a schematic flowchart of a UE sensing method according to this application.

For 901 to 913, refer to step 801 to step 813 in FIG. 16. To avoid repetition, details are not described herein again.

Optionally, step 914 is included.

914. Optionally, the sensing network element has a sensing requirement. For example, the sensing network element needs to perform sensing for the first sensing service, and sends a sensing control request to selected UE if determining that the UE needs to perform sensing. The sensing control request indicates the UE to perform sensing for the first sensing service.

915. Optionally, the UE sends a sensing request message to the RAN based on the sensing control request of the sensing network element or based on a sensing requirement of the first sensing service of the UE.

A sensing resource request message is used to request a sensing resource for the first sensing service.

Optionally, the sensing request message may be an RRC message.

916. The RAN performs, based on the second sensing authorization indication information and/or the second sensing authorization parameter that are/is obtained from the AMF in step 904, or based on the second sensing authorization indication information and/or the second sensing authorization parameter that are/is obtained from the SMF in step 912, an authorization check on the first sensing service requested in the sensing request message of the JE.

A subsequent step is performed when the first sensing service of the UE being authorized is determined.

917. The RAN returns sensing resource indication information to the UE, where the sensing resource indication information indicates the sensing resource.

918. The UE obtains first sensing data of the first sensing service based on the sensing resource. For details, refer to the description in step 817.

919. The UE sends the first sensing data to the sensing network element.

Optionally, step 920 may be further included.

920. The UE receives second sensing data from the sensing network element.

It should be noted that, in step 919, the UE sends the first sensing data to the sensing network element. In a possible case, the UE returns the first sensing data to the sensing network element based on the sensing control request of the sensing network element. In another possible case, because a processing capability of the UE is limited, the UE sends the first sensing data to the sensing network element for processing and receives the second sensing data from the sensing network element.

The foregoing describes in detail the UE sensing method according to this application. The following describes a communication apparatus according to this application.

Figure 18:
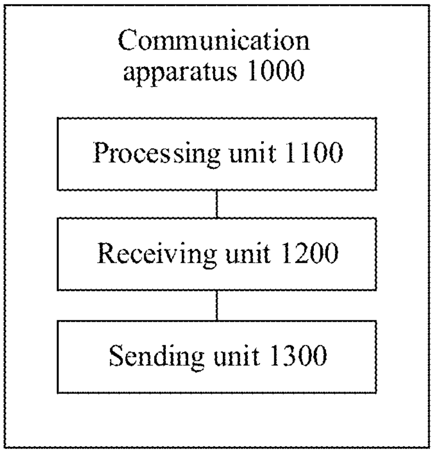
FIG. 18 is a schematic block diagram of a communication apparatus according to this application.

FIG. 18 is a schematic block diagram of a communication apparatus according to this application. As shown in FIG. 18, a communication apparatus 1000 includes a processing unit 1100, a receiving unit 1200, and a sending unit 1300.

Optionally, the communication apparatus 1000 may correspond to the NEF network element in the embodiments of this application.

In this case, the units of the communication apparatus 1000 are configured to implement the following functions:

The receiving unit 1200 is configured to receive a first sensing service request message, where the first sensing service request message is used to request a first sensing service, and the first sensing service senses a user equipment UE.

The processing unit 1100 is configured to determine, based on the first sensing service request message, that the first sensing service is authorized.

The sending unit 1300 is configured to send a second sensing service request message to a sensing network element, where the second sensing service request message is used to request the first sensing service.

Optionally, in an embodiment, the sending unit 1300 is specifically configured to send a sensing authorization request message to a UDM network element based on the first sensing service request message, where the sensing authorization request message is used to request to confirm that the first sensing service is authorized.

The receiving unit 1200 is specifically configured to receive an authorization response message from the UDM network element, where the authorization response message indicates that the first sensing service is authorized.

The processing unit 1100 is specifically configured to determine, based on the authorization response message, that the first sensing service is authorized.

Optionally, in an embodiment, the authorization response message includes the service authorization information.

Optionally, in an embodiment, the sensing authorization request message includes one or more of the following:

a first identifier of the UE, a sensing service type, a sensing distance, a sensing area, a sensing speed range, a sensing distance resolution, an angle measurement accuracy of sensing, a sensing speed resolution, a quality of service QoS requirement, a sensing object identification accuracy, a sensing object identification false alarm rate, a sensing data accuracy, a sensing data update frequency, a sensing dimension, a sensing feedback manner, a sensing requester type, a sensing requester identifier, a sensing application type, and a sensing application identifier.

The sensing distance, the sensing area, the sensing speed range, the sensing distance resolution, the angle measurement accuracy of sensing, the sensing speed resolution, the sensing quality of service QoS requirement, the sensing object identification accuracy, the sensing object identification false alarm rate, the sensing data accuracy, the sensing data update frequency, the sensing dimension, the sensing feedback manner, the sensing service type, the sensing requester type, the sensing requester identifier, the sensing application type, and the sensing application identifier are determined based on the first sensing service request message.

Optionally, in an embodiment, the first sensing service request message includes the first identifier of the UE, and the sensing authorization request message includes a second identifier of the UE.

The sensing authorization response message includes the second identifier of the UE.

The second sensing service request message includes the second identifier of the UE.

Optionally, in an embodiment, the processing unit 1100 is further configured to obtain location information of the UE from a gateway mobile location center (GMLC) network element based on the second identifier of the UE.

The second sensing service request message includes the location information of the UE.

In the foregoing implementations, the receiving unit 1200 and the sending unit 1300 may also be integrated into one transceiver unit, and have both of a receiving function and a sending function. This is not limited herein.

In the embodiments of the NEF network element corresponding to the communication apparatus 1000, the processing unit 1100 is configured to perform processing and/or an operation implemented inside the NEF network element in addition to sending and receiving actions. The receiving unit 1200 is configured to perform a receiving action, and the sending unit 1300 is configured to perform a sending action.

Optionally, the communication apparatus 1000 may correspond to the sensing network element (or the SF network element) in the embodiments of this application.

In this case, the units of the communication apparatus 1000 are configured to implement the following functions:

The receiving unit 1200 is configured to receive a second sensing service request message, where the second sensing service request message is used to request a first sensing service, and the first sensing service senses a UE.

The processing unit 1100 is configured to determine a first network element based on the second sensing service request message, where the first network element supports the first sensing service.

The sending unit 1300 is configured to send a sensing control request message to the first network element, where the sensing control request message is used to control a RAN network element to perform a sensing operation of the first sensing service.

Optionally, in an embodiment, the second sensing service request message includes a second identifier of the UE, and the processing unit 1100 is specifically configured to: determine the first network element based on the second identifier of the UE.

Optionally, in an embodiment, the second sensing service request message includes location information of the UE, and the processing unit 1100 is specifically configured to: determine the first network element based on the location information of the UE.

Optionally, in an embodiment, the second sensing service request message includes a second identifier of the UE, and the processing unit 1100 is specifically configured to:

obtain location information of the UE based on the second identifier of the UE included in the second sensing service request message; and determine the first network element based on the location information of the UE.

Optionally, in an embodiment, the processing unit 1100 is further configured to allocate a sensing correlation identifier to the UE, where the sensing correlation identifier is used to identify sensing data of the UE.

Optionally, in an embodiment, the sensing control request message includes the location information of the UE and/or the sensing correlation identifier, where the sensing correlation identifier is used to identify the sensing data of the UE.

Optionally, in an embodiment, the receiving unit 1200 is further configured to receive first sensing data and the sensing correlation identifier from the first network element.

Optionally, in an embodiment, the first network element is an AMF network element, and the processing unit 1100 is further configured to:

establish a sensing signaling connection between the communication apparatus and the AMF network element, where the sensing signaling connection is used by the communication apparatus and the AMF network element to interact signaling of the first sensing service of the UE.

In the foregoing implementations, the receiving unit 1200 and the sending unit 1300 may also be integrated into one transceiver unit, and have both of a receiving function and a sending function. This is not limited herein.

In the embodiments of the SF network element corresponding to the communication apparatus 1000, the processing unit 1100 is configured to perform processing and/or an operation implemented inside the SF network element in addition to sending and receiving actions. The receiving unit 1200 is configured to perform a receiving action, and the sending unit 1300 is configured to perform a sending action.

Optionally, the communication apparatus 1000 may correspond to the second network element in the embodiments of this application.

In this case, the units of the communication apparatus 1000 are configured to implement the following functions:

The receiving unit 1200 is configured to receive a first request message, where the first request message is used to request a sensing service of the UE.

The sending unit 1300 is configured to send a response message of the first request message, where the response message indicates that the sensing service of the UE is accepted.

Optionally, in an embodiment, the processing unit 1100 is further configured to determine that the sensing service of the UE is authorized.

Optionally, in an embodiment, the first request message includes sensing indication information, and the sensing indication information indicates to request the sensing service.

Optionally, in an embodiment, the response message includes sensing accept indication information, and the sensing accept indication information indicates that the sensing service of the UE is accepted.

Optionally, in an embodiment, the response message includes address information of a sensing network element.

Optionally, in an embodiment, the processing unit 1100 is specifically configured to:

obtain subscription information of the UE, where the subscription information includes service authorization information of the UE; and determine, based on the service authorization information, that the sensing service of the UE is authorized.

Optionally, in an embodiment, the service authorization information includes first sensing authorization indication information, and the first sensing authorization indication information indicates that the sensing service of the UE is authorized.

Optionally, in an embodiment, the service authorization information includes a first sensing authorization parameter, and the first sensing authorization parameter includes one or more of the following:

a sensing service type, a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, a sensing feedback manner, a sensing requester type, a sensing requester identifier, a sensing application type, and a sensing application identifier.

Optionally, in an embodiment, the processing unit 1100 is configured to obtain second sensing authorization indication information and/or a second sensing authorization parameter based on the service authorization information.

The sending unit 1300 is further configured to send the second sensing authorization indication information and/or the second sensing authorization parameter to a RAN network element.

Optionally, in an embodiment, the receiving unit 1200 is further configured to receive a first sensing service request message from the UE, where the first sensing service request is used to request a first sensing service.

The sending unit 1300 is further configured to send a second sensing service request message to the sensing network element, where the second sensing service request message is used to request the first sensing service for the UE.

Optionally, in an embodiment, the communication apparatus is an AMF network element or an SMF network element.

Optionally, in an embodiment, the first request message is specifically a session management request message, and the response message is specifically a session management response message.

Alternatively, the first request message is specifically a registration request message, and the response message is a registration accept message.

Alternatively, the first request message is specifically a service request message, and the response message is a service accept message.

In the embodiments of the second network element corresponding to the communication apparatus 1000, the processing unit 1100 is configured to perform processing and/or operations implemented inside the second network element in addition to sending and receiving actions. The receiving unit 1200 is configured to perform a receiving action, and the sending unit 1300 is configured to perform a sending action.

Optionally, the communication apparatus 1000 may correspond to the UE in the embodiments of this application.

In this case, the units of the communication apparatus 1000 are configured to implement the following functions:

The sending unit 1300 is configured to send a first request message to a second network element, where the first request message is used to request a sensing service.

The receiving unit 1200 is configured to receive a response message of the first request message, where the response message indicates that the sensing service of the UE is accepted.

Optionally, in an embodiment, the first request message includes sensing indication information, and the sensing indication information indicates to request the sensing service.

Optionally, in an embodiment, the response message carries sensing accept indication information, and the sensing accept indication information indicates that the sensing service of the UE is accepted.

Optionally, in an embodiment, the sending unit 1300 is further configured to send a first sensing service request message to the second network element, where the first sensing service request message is used to request a first sensing service.

The receiving unit 1200 is further configured to receive second sensing data of the first sensing service from the second network element.

Optionally, in an embodiment, the sending unit 1300 is configured to send a sensing request message to a RAN network element for the first sensing service, where the sensing request message is used to request a sensing resource.

The receiving unit 1200 is further configured to receive sensing resource indication information from the RAN network element, where the sensing resource indication information indicates the sensing resource.

The processing unit 1100 is further configured to perform sensing by using the sensing resource, to obtain first sensing data of the first sensing service.

Optionally, in an embodiment, the sending unit 1300 is further configured to send a sensing request message to a RAN network element for the first sensing service, where the sensing request message is used to request a sensing resource.

The receiving unit 1200 is further configured to receive sensing resource indication information from the RAN network element, where the sensing resource indication information indicates the sensing resource.

The receiving unit 1200 is further configured to receive a sensing signal from the RAN network element based on the sensing resource.

The processing unit 1100 is further configured to obtain first sensing data of the first sensing service based on the sensing signal.

Optionally, in an embodiment, the sending unit 1300 is further configured to send a sensing request message to a RAN network element for the first sensing service, where the sensing request message is used to request the RAN network element to perform sensing.

The receiving unit 1200 is further configured to receive sensing resource indication information from the RAN network element, where the sensing resource indication information indicates a sensing resource.

The sending unit 1300 is further configured to send a sensing signal based on the sensing resource.

The receiving unit 1200 is further configured to receive first sensing data of the first sensing service from the RAN network element.

Optionally, in an embodiment, the receiving unit 1200 is further configured to receive a sensing control request from a sensing network element, where the sensing control request indicates the UE to perform sensing.

Optionally, in an embodiment, the sending unit 1300 is further configured to send the first sensing data to the sensing network element.

The receiving unit 1200 is further configured to receive second sensing data of the first sensing service from the sensing network element.

Optionally, in an embodiment, the first request message is specifically a session management request message, and the response message is specifically a session management response message.

Alternatively, the first request message is specifically a registration request message, and the response message is a registration accept message.

Alternatively, the first request message is specifically a service request message, and the response message is a service accept message.

In the embodiments of the UE corresponding to the communication apparatus 1000, the processing unit 1100 is configured to perform processing and/or an operation implemented inside the UE in addition to sending and receiving actions. The receiving unit 1200 is configured to perform a receiving action, and the sending unit 1300 is configured to perform a sending action.

Optionally, the communication apparatus 1000 may correspond to the RAN network element in the embodiments of this application.

In this case, the units of the communication apparatus 1000 are configured to implement the following functions:

The receiving unit 1200 is configured to receive a sensing request message from user equipment UE, where the sensing request message is used to request a sensing resource.

The sending unit 1300 is configured to send sensing resource indication information to the UE, where the sensing resource indication information indicates the sensing resource.

Optionally, in an embodiment, the receiving unit 1200 is configured to receive second sensing authorization indication information and/or a second sensing authorization parameter of the UE from a second network element, where the second sensing authorization indication information indicates that a sensing service of the UE is authorized.

Optionally, in an embodiment, the processing unit 1100 is further configured to determine, based on the second sensing authorization indication information and/or the second sensing authorization parameter, to authorize the sensing request of the UE.

Optionally, in an embodiment, the sensing request message further includes a sensing requirement.

The processing unit 1100 is further configured to determine, based on the second sensing authorization indication information and/or the second sensing authorization parameter and the sensing requirement, to authorize the sensing request.

Optionally, in an embodiment, the sending unit 1300 is further configured to send a sensing signal to the UE based on the sensing resource.

Optionally, in an embodiment, the receiving unit 1200 is further configured to receive a sensing signal from the UE based on the sensing resource.

The processing unit 1100 is further configured to obtain first sensing data based on the sensing signal.

The sending unit 1300 is further configured to send the first sensing data to the UE.

Optionally, in an embodiment, the second sensing authorization parameter includes one or more of the following:

a sensing service type, a sensing distance, a sensing area, a sensing speed range, a sensing distance resolution, an angle measurement accuracy of sensing, a sensing speed resolution, a sensing quality of service QoS requirement, a sensing object identification accuracy, a sensing object identification false alarm rate, a sensing data accuracy, a sensing data update frequency, a sensing dimension, and a sensing feedback manner.

Optionally, in an embodiment, the sensing requirement includes one or more of the following:

a sensing distance, a sensing area, a sensing speed range, a sensing distance resolution, an angle measurement accuracy of sensing, a sensing speed resolution, the sensing quality of service QoS requirement, a sensing object identification accuracy, a sensing object identification false alarm rate, a sensing data accuracy, a sensing data update frequency, a sensing dimension, and a sensing feedback manner.

In the embodiments of the RAN network element corresponding to the communication apparatus 1000, the processing unit 1100 is configured to perform processing and/or an operation implemented inside the RAN network element in addition to sending and receiving actions. The receiving unit 1200 is configured to perform a receiving action, and the sending unit 1300 is configured to perform a sending action.

Optionally, the communication apparatus 1000 may correspond to the UDM network element in the embodiments of this application.

In this case, the units of the communication apparatus 1000 are configured to implement the following functions:

The receiving unit 1200 is configured to receive a sensing authorization request message from an NEF network element, where the sensing authorization request message is used to request to confirm that a sensing service of user equipment UE is authorized.

The sending unit 1300 is configured to send an authorization response message to the NEF network element, where the authorization response message indicates that the sensing service of the UE is authorized.

Optionally, in an embodiment, the sensing authorization request message includes one or more of the following:

a first identifier of the UE, a sensing service type, a sensing distance, a sensing area, a sensing speed range, a sensing distance resolution, an angle measurement accuracy of sensing, a sensing speed resolution, a QoS requirement, a sensing object identification accuracy, a sensing object identification false alarm rate, a sensing data accuracy, a sensing data update frequency, a sensing dimension, a sensing feedback manner, a sensing requester type, a sensing requester identifier, a sensing application type, and a sensing application identifier.

Optionally, in an embodiment, the authorization response message includes service authorization information of the UE.

Optionally, in an embodiment, the receiving unit 1200 is further configured to receive a first request message from an SF network element, where the first request message is used to request a serving AMF of the UE.

The sending unit 1300 is further configured to return a response message of the first request message to the SF network element, where the response message includes an identifier of the serving AMF of the UE.

In the embodiments of the UDM network element corresponding to the communication apparatus 1000, the processing unit 1100 is configured to perform processing and/or an operation implemented inside the UDM network element in addition to sending and receiving actions. The receiving unit 1200 is configured to perform a receiving action, and the sending unit 1300 is configured to perform a sending action.

Figure 19:
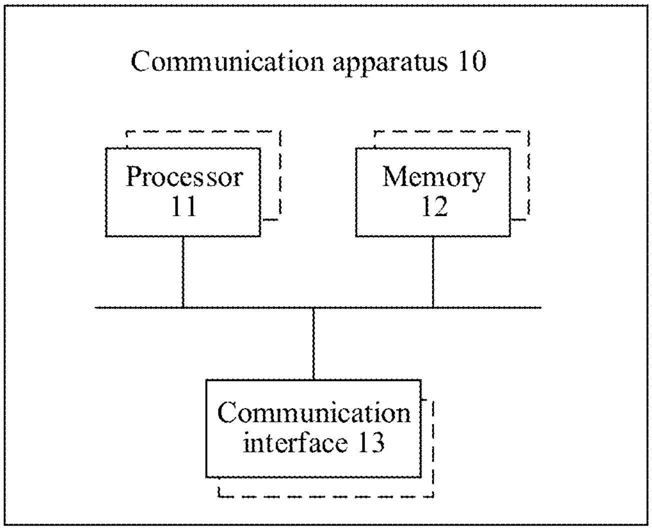
FIG. 19 is a schematic diagram of a structure of a communication apparatus according to this application.

FIG. 19 is a schematic diagram of a structure of a communication apparatus according to this application. As shown in FIG. 19, a communication apparatus 10 includes: one or more processors 11, one or more memories 12, and one or more communication interfaces 13. The processor 11 is configured to control the communication interface 13 to receive and send a signal. The memory 12 is configured to store a computer program. The processor 11 is configured to invoke the computer program from the memory 12 and run the computer program, to enable the communication apparatus 10 to perform processing performed by a corresponding network element (for example, an NEF network element, a sensing network element, a second network element, UE, a RAN network element, or a UDM network element) in the method embodiments of this application.

For example, the processor 11 may have a function of the processing unit 1100 shown in FIG. 11, and the communication interface 13 may have a function of the receiving unit 1200 and/or the sending unit 1300 shown in FIG. 11. Specifically, the processor 11 may be configured to perform processing or an operation performed inside a corresponding network element, and the communication interface 13 is configured to perform a sending and/or receiving operation performed by the corresponding network element.

In an implementation, the communication apparatus 10 may be a corresponding network element in the method embodiments. In this implementation, the communication interface 13 may be a transceiver. The transceiver may include a receiver and/or a transmitter. Optionally, the processor 11 may be a baseband apparatus, and the communication interface 13 may be a radio frequency apparatus.

In another implementation, the communication apparatus 10 may be a chip (or a chip system) installed in a corresponding network element. In this implementation, the communication interface 13 may be an interface circuit or an input/output interface.

In FIG. 19, a dashed box behind a component (for example, the processor, the memory, or the communication interface) indicates that there may be more than one component.

Optionally, the memory and the processor in the foregoing apparatus embodiments may be physically independent units, or the memory and the processor may be integrated together. This is not limited herein.

It should be understood that the "corresponding network element" is any one of the NEF network element, the sensing network element, the second network element, the UE, the RAN network element, or the UDM network element in the embodiments.

In addition, this application further provides a computer-readable storage medium. The computer-readable storage medium stores computer instructions. When the computer instructions run on a computer, an operation and/or processing performed by a corresponding network element in the method embodiments of this application are/is performed.

In addition, this application further provides a computer program product. The computer program product includes computer program code or instructions. When the computer program code or the instructions runs/run on a computer, an operation and/or processing performed by a corresponding network element in the method embodiments of this application are/is performed.

In addition, this application further provides a chip. The chip includes a processor. A memory configured to store a computer program is disposed independent of the chip. The processor is configured to execute the computer program stored in the memory, to enable a communication apparatus in which the chip is installed to perform an operation and/or processing performed by a corresponding network element in any one of the method embodiments.

Further, the chip may include a communication interface. The communication interface may be an input/output interface, an interface circuit, or the like. Further, the chip may include the memory.

Optionally, there may be one or more processors, and there may be one or more memories.

In addition, this application further provides a communication apparatus (for example, may be a chip or a chip system), including a processor and a communication interface. The communication interface is configured to receive (or referred to as input) data and/or information, and transmit the received data and/or information to the processor. The processor processes the data and/or information. The communication interface is further configured to output data and/or information processed by the processor, to enable an operation and/or processing performed by a corresponding network element in any one of the method embodiments to be performed.

In addition, this application further provides a communication apparatus, including at least one processor, where the at least one processor is coupled to at least one memory. The at least one processor is configured to execute a computer program or instructions stored in the at least one memory, to enable the communication apparatus to perform an operation and/or processing performed by a corresponding network element in any one of the method embodiments.

In addition, this application further provides a communication device, including a processor and a memory. Optionally, the communication apparatus may further include a transceiver. The memory is configured to store a computer program. The processor is configured to invoke and run the computer program stored in the memory, and control the transceiver to receive and send a signal, to enable the communication device to perform an operation and/or processing performed by a corresponding network element in any one of the method embodiments.

This application further provides a communication system, including one or more of the NEF network element, the sensing network element (namely, the SF network element), the second network element, the UE, the RAN network element, or the UDM network element in the embodiments of this application.

A memory in embodiments of this application may be a volatile memory or a nonvolatile memory, or may include both a volatile memory and a nonvolatile memory. The non-volatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through example but not limitative description, RAMs in many forms are available, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DRRAM). It should be noted that the memory of the systems and methods described in this specification includes but is not limited to these and any memory of another proper type.

The methods provided in the foregoing embodiments may be fully or partially implemented by software, hardware, firmware, or any combination thereof. When software is used to implement the embodiments, all or a part of the embodiments may be implemented in a form of a computer program product. The computer program product may include one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media.

To clearly describe the technical solutions in embodiments of this application, terms such as "first" and "second" are used in embodiments of this application to distinguish between same items or similar items that provide basically same functions or purposes. For example, the first sensing service request message and the second sensing service request message are merely used to distinguish between different sensing service request messages. A person skilled in the art may understand that numbers such as "first" and "second" do not limit a quantity and an execution sequence, and words such as "first" and "second" are not limited to be definitely different.

In embodiments of this application, "at least one" means one or more, and "a plurality of" means two or more. "And/or" is an association relationship for describing associated objects, and indicates that three relationships may exist. For example, A and/or B may indicate the following cases: Only A exists, both A and B exist, and only B exists, where A and B may be in a singular form or a plural form. The character "/" generally indicates an "or" relationship between the associated objects. At least one of the following items (pieces) or a similar expression thereof indicates any combination of these items, including a single item or any combination of a plurality of items. For example, at least one of a, b, or c may represent a, b, c, a and b, a and c, b and c, or a, b, and c. a, b, and c each may be singular or plural.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk drive, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal device sensing method, comprising:

receiving, by a network capability exposure function network element, a first sensing service request message;

determining, by the network capability exposure function network element, based on the first sensing service request message, that a first sensing service is authorized by sending a sensing authorization request message to a unified data management (UDM) network element based on the first sensing service request message that requests a confirmation that the first sensing service is authorized, and receiving from the UDM network element an authorization response message that includes the confirmation; and sending, by the network capability exposure function network element, a second sensing service request message to a sensing network element, wherein the second sensing service request message is used to request the first sensing service to sense a user equipment (UE).

2. The method according to claim 1, wherein the authorization response message comprises service authorization information of the UE which indicates that the first sensing service is authorized.

3. The method according to claim 1, wherein the sensing authorization request message comprises, based on the first sensing service request message, one or more of an identifier of the UE, a sensing service type, a sensing distance, a sensing area, a sensing speed range, a sensing distance resolution, a sensing angle measurement accuracy, a sensing speed resolution, a sensing quality of service QoS requirement, a sensing object identification accuracy, a sensing object identification false alarm rate, a sensing data accuracy, a sensing data update frequency, a sensing dimension, a sensing feedback manner, a sensing requester type, a sensing requester identifier, a sensing application type, or a sensing application identifier.

4. The method according to claim 1, wherein the first sensing service request message includes a first identifier of the UE, and the sensing authorization request message includes a second identifier of the UE.

5. The method according to claim 4, wherein programming instructions, when executed by at least one processor, cause the terminal to: before sending the second sensing service request message, obtain location information of the UE from a gateway mobile location center (GMLC) network element based on the second identifier of the UE.

6. A terminal device sensing method, comprising:

receiving, by a sensing function network element, a sensing service request message, including location information of a UE, used to request a first sensing service, wherein the first sensing service is to sense the UE;

determining, by the sensing function network element, a first network element based on the location information of the UE received in the sensing service request message, wherein the first network element supports the first sensing service; and sending, by the sensing function network element, a sensing control request message to the first network element, wherein the sensing control request message is used to control a RAN network element to perform a sensing operation of the first sensing service.

7. The method according to claim 6, further comprising:

allocating a sensing correlation identifier to the UE, wherein the sensing correlation identifier is used to identify sensing data of the UE.

8. The method according to claim 6, wherein the sensing control request message comprises location information of the UE or a sensing correlation identifier used to identify the sensing data of the UE.

9. The method according to claim 6, further comprising: receiving sensing data and a sensing correlation identifier from the first network element.

10. A communication apparatus, comprising:
a transceiver;
at least one processor; and
one or more memories coupled to the at least one processor and storing programming instructions for execution by the at least one processor to cause the communication apparatus to:
receive a first sensing service request message;
determine based on the first sensing service request message, that the first sensing service is authorized by
sending, to a unified data management (UDM) network element based on the first sensing service request message, a sensing authorization request message requesting confirmation that the first sensing service is authorized, and
receiving, from the UDM network element, an authorization response message indicating that the first sensing service is authorized; and
send a second sensing service request message to a sensing network element, wherein the second sensing service request message is used to request the first sensing service to sense a user equipment (UE).

11. The apparatus according to claim 10, wherein the authorization response message comprises service authorization information of the UE, and the service authorization information indicates that the first sensing service is authorized.

12. The apparatus according to claim 10, wherein the sensing authorization request message comprises, based on the first sensing service request message, one or more of
an identifier of the UE, a sensing service type, a sensing distance, a sensing area, a sensing speed range, a sensing distance resolution, a sensing angle measurement accuracy, a sensing speed resolution, a sensing quality of service QoS requirement, a sensing object identification accuracy, a sensing object identification false alarm rate, a sensing data accuracy, a sensing data update frequency, a sensing dimension, a sensing feedback manner, a sensing requester type, a sensing requester identifier, a sensing application type, or a sensing application identifier.

13. The communication apparatus according to claim 10, wherein the first sensing service request message includes a first identifier of the UE, and the sensing authorization request message includes a second identifier of the UE.

14. The communication apparatus according to claim 13, wherein programming instructions, when executed by at least one processor, cause the communication apparatus to: before sending the second sensing service request message, obtain location information of the UE from a gateway mobile location center (GMLC) network element based on the second identifier of the UE.

15. A communication apparatus, comprising:
a transceiver;
at least one processor; and
one or more memories coupled to the at least one processor and storing programming instructions for execution by the at least one processor to cause the communication apparatus to:
receive a sensing service request message, including location information of a UE, used to request a first sensing service, wherein the first sensing service is to sense the UE;
determine a first network element based on the location information of the UE received in the sensing service request message, wherein the first network element supports the first sensing service; and
send a sensing control request message to the first network element, wherein the sensing control request message is used to control a RAN network element to perform a sensing operation of the first sensing service.

16. The communication apparatus according to claim 15, wherein the programming instructions, when executed by the at least one processor, further cause the communication apparatus to:
allocate a sensing correlation identifier to the UE, wherein the sensing correlation identifier is used to identify sensing data of the UE.

17. The communication apparatus according to claim 15, wherein the sensing control request message comprises location information of the UE or a sensing correlation identifier used to identify the sensing data of the UE.

* * * * *